United States Patent
Lebby

(10) Patent No.: US 10,162,111 B1
(45) Date of Patent: Dec. 25, 2018

(54) MULTI-FIBER/PORT HERMETIC CAPSULE SEALED BY METALLIZATION AND METHOD

(71) Applicant: Lightwave Logic Inc., Longmont, CO (US)

(72) Inventor: Michael Lebby, San Francisco, CA (US)

(73) Assignee: Lightwave Logic Inc., Englewood, CO (US)

( * ) Notice: Subject to any disclaimer, the term of this patent is extended or adjusted under 35 U.S.C. 154(b) by 0 days.

(21) Appl. No.: 15/994,966

(22) Filed: May 31, 2018

(51) Int. Cl.
*G02B 6/12* (2006.01)
*G02B 6/13* (2006.01)

(52) U.S. Cl.
CPC ............ *G02B 6/12004* (2013.01); *G02B 6/13* (2013.01); *G02B 2006/12121* (2013.01); *G02B 2006/12142* (2013.01)

(58) Field of Classification Search
CPC ...... G02B 6/12004; G02B 2006/12121; G02B 6/12142; G02B 6/13
See application file for complete search history.

(56) References Cited

U.S. PATENT DOCUMENTS

| | | | | |
|---|---|---|---|---|
| 6,194,789 B1 * | 2/2001 | Zhou | ............. | H01L 23/06 257/787 |
| 6,458,263 B1 * | 10/2002 | Morales | ............. | B81C 1/00666 205/118 |
| 6,647,185 B2 * | 11/2003 | Hajjar | ............. | G02B 6/12004 385/14 |
| 7,352,923 B2 * | 4/2008 | Mazed | ............. | H04B 10/40 385/14 |
| 7,824,806 B2 * | 11/2010 | Visco | ............. | H01B 1/122 429/231.9 |
| 8,048,570 B2 * | 11/2011 | Visco | ............. | H01B 1/122 429/231.9 |
| 8,404,388 B2 * | 3/2013 | Visco | ............. | H01B 1/122 429/231.9 |
| 8,967,887 B2 * | 3/2015 | Bowen | ............. | G02B 6/4251 385/88 |
| 9,130,198 B2 * | 9/2015 | Visco | ............. | H01B 1/122 |
| 9,513,380 B2 * | 12/2016 | Liu | ............. | A61B 6/42 |
| 9,562,852 B1 * | 2/2017 | Barwicz | ............. | G01N 21/39 |
| 9,625,379 B2 * | 4/2017 | Barwicz | ............. | G01N 21/39 |
| 9,897,537 B2 * | 2/2018 | Barwicz | ............. | G01N 21/39 |

(Continued)

*Primary Examiner* — Andrew Jordan
(74) *Attorney, Agent, or Firm* — Parsons & Goltry; Robert Parsons; Michael Goltry

(57) ABSTRACT

An hermetically sealed monolithic photonic integrated circuit (PIC) including optical components and multiple optical and electrical inputs/outputs. The integrated circuit including a semiconductor/metal base with sensitive semiconductor/polymer electrical and optical components formed therein. The electrical and optical components having multiple optical and electrical inputs, multiple optical and electrical outputs, and/or multiple optical and electrical inputs and outputs. A semiconductor/metal basic lid is sealed to the semiconductor/metal base by metallization so as to form a chamber including the sensitive semiconductor/polymer electrical and optical components and hermetically sealing the chamber and the sensitive components from the ambient in a basic hermetic capsule with multiple optical pathways coupling multiple optical fibers to the optical components sealed within the chamber.

19 Claims, 23 Drawing Sheets

(56) References Cited

U.S. PATENT DOCUMENTS

| | | | |
|---|---|---|---|
| 2002/0071637 A1* | 6/2002 | Centanni | G02B 6/2558 385/51 |
| 2003/0035606 A1* | 2/2003 | Hajjar | G02B 6/12004 385/2 |
| 2007/0037058 A1* | 2/2007 | Visco | H01B 1/122 429/246 |
| 2008/0182157 A1* | 7/2008 | Visco | H01B 1/122 429/50 |
| 2009/0154872 A1* | 6/2009 | Sherrer | G02B 6/4248 385/14 |
| 2010/0112454 A1* | 5/2010 | Visco | H01B 1/122 429/246 |
| 2013/0224593 A1* | 8/2013 | Visco | H01B 1/122 429/218.1 |
| 2014/0162108 A1* | 6/2014 | Visco | H01M 4/13 429/131 |
| 2015/0360463 A1* | 12/2015 | Sadwick | H01J 23/165 347/110 |
| 2016/0027847 A1* | 1/2016 | Liu | A61B 6/42 378/62 |
| 2016/0028053 A1* | 1/2016 | Visco | H01B 1/122 429/405 |
| 2017/0016817 A1* | 1/2017 | Barwicz | G01N 21/39 |
| 2017/0016818 A1* | 1/2017 | Barwicz | G01N 21/39 |
| 2017/0016819 A1* | 1/2017 | Barwicz | G01N 21/39 |
| 2017/0063335 A1* | 3/2017 | Park | H04B 11/00 |
| 2017/0077900 A1* | 3/2017 | Park | H03H 9/706 |
| 2017/0082558 A1* | 3/2017 | Liu | A61B 6/4233 |
| 2017/0288645 A1* | 10/2017 | Park | H03H 3/02 |

* cited by examiner

MULTI-FIBER/PORT HERMETIC CAPSULE SEALED BY METALLIZATION AND METHOD

FIELD OF THE INVENTION

This invention relates to basic hermetically sealed capsules with multiple optical fibers optically coupled to multiple input/output ports.

BACKGROUND OF THE INVENTION

Polymer modulators driven by semiconductor lasers are a popular apparatus for modulating a light beam. In a copending application entitled "Polymer Modulator and Laser Integrated on a Common Platform and Method", filed Aug. 31, 2017, with application Ser. No. 15/692,080, and incorporated herein by reference, the modulator and laser are integrated on a common platform, such as an InP chip or substrate. Further, in a copending application entitled "Hermetic Capsule and Method", filed Jan. 26, 2018, with application Ser. No. 15/881,718, and incorporated herein by reference, the integrated platform is hermetically sealed with a semiconductor/metal base and a semiconductor/metal lid sealed to the base. In many applications it is highly desirable to provide multiple input/output ports and multiple optical fibers, one each, optically coupled to each input/output port.

It would be highly advantageous, therefore, to provide the foregoing in the copending applications.

Accordingly, it is an object of the present invention to provide a new and improved hermetic capsule sealing electrical and/or optical components on a common platform and including multiple optical and electrical input/output ports with multiple optical fibers optically coupled to the multiple optical ports.

It is another object of the present invention to provide a new and improved hermetic capsule sealing one or more semiconductor lasers and polymer modulators integrated on a common platform, with multiple input/output ports.

It is another object of the present invention to provide a new and improved hermetic capsule with multiple input/output ports coupled to multiple optical fibers in a wafer scale solution that is cost effective.

SUMMARY OF THE INVENTION

Briefly to achieve the desired objects and advantages of the instant invention in accordance with a preferred embodiment a hermetically sealed monolithic photonic integrated circuit (PIC) including optical components and multiple optical and electrical inputs/outputs is provided. The integrated circuit includes a semiconductor/metal base with sensitive semiconductor/polymer electrical and optical components formed therein. The electrical and optical components having multiple optical and electrical inputs, multiple optical and electrical outputs, and/or multiple optical and electrical inputs and outputs. A semiconductor/metal basic lid is sealed to the semiconductor/metal base by metallization so as to form a chamber including the sensitive semiconductor/polymer electrical and optical components and hermetically sealing the chamber and the sensitive components from the ambient in a basic hermetic capsule with multiple optical pathways coupling multiple optical fibers to the optical components sealed within the chamber.

To further achieve the desired objects and advantages of the present invention a specific embodiment of a hermetically sealed monolithic photonic integrated circuit (PIC) including optical components and multiple optical and electrical inputs/outputs is provided. The integrated circuit includes a semiconductor/metal base with sensitive semiconductor/polymer electrical and optical components formed therein. The electrical and optical components include multiple optical and electrical inputs, multiple optical and electrical outputs, and/or multiple optical and electrical inputs and outputs. A semiconductor/metal embedded lid is formed and sealed to the semiconductor/metal base by metallization so as to form a chamber including at least one of the sensitive semiconductor/polymer electrical and optical components and hermetically sealing the chamber and the at least one sensitive component from the ambient in an embedded hermetic capsule. A basic hermetic capsule surrounding and hermetically sealing the sensitive semiconductor/polymer electrical and optical components includes the embedded hermetic capsule, and multiple optical pathways coupling multiple optical fibers to the optical components sealed within the chamber.

To further achieve the desired objects and advantages of the present invention a specific embodiment of a method of fabricating a hermetically sealed monolithic photonic integrated circuit (PIC) including optical components and multiple optical and electrical inputs/outputs includes the following steps. Providing a first semiconductor/metal wafer and fabricating sensitive semiconductor/polymer electrical and optical components in the first semiconductor/metal wafer defining a semiconductor/metal base. Fabricating a semiconductor/metal embedded lid in a shell-like form providing edges defining a volume space within the edges and hermetically sealing the edges of the semiconductor/metal embedded lid to the semiconductor/metal base by metallization so as to form a first chamber including at least one of the sensitive semiconductor/polymer electrical and optical components. The embedded lid and base defining an embedded hermetic capsule hermetically sealing the at least one sensitive semiconductor/polymer electrical and optical component from the ambient. Fabricating a semiconductor/metal basic lid in a shell-like form providing edges defining a volume space within the edges and hermetically sealing the edges of the semiconductor/metal basic lid to the semiconductor/metal base by metallization so as to form a second chamber including the sensitive semiconductor/polymer electrical and optical components and the embedded hermetic capsule. The basic lid and base defining a basic hermetic capsule hermetically sealing the sensitive semiconductor/polymer electrical and optical components and the embedded hermetic capsule from the ambient, and providing multiple optical pathways coupling multiple optical fibers to the optical components sealed within the chamber.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

A primary object of the present invention is to provide hermetically sealed capsules for sensitive laser and polymer modulators integrated on a common platform with multiple input/output ports and multiple optical fibers optically coupled to the ports. An example of such components is the monolithic photonic integrated circuits described in copending patent application entitled "POLYMER MODULATOR AND LASER INTEGRATED ON A COMMON PLATFORM AND METHOD", filed Aug. 31, 2017, Ser. No. 15/692,080, and incorporated herein by reference. Further, examples of hermetically sealed capsules are described in a copending application entitled "Hermetic Capsule and Method", filed Jan. 26, 2018, with application Ser. No. 15/881,718, and incorporated herein by reference. In the specific example set forth below, the common platform is single crystal InP, because lasers are naturally fabricated from InP and are already monolithic (part of the same material). It will be understood however, that the common platform could be InP, GaAs, GaN, sapphire, or any combinations thereof. Also, while the laser described herein is generally InP, it will be understood that the lasers could be GaAs, GaN, etc. As will also be understood from the following description, the modulators in this specific example are polymer based. Further, the optical connection between the laser and modulator, in this specific example, is either polymer waveguides, or semiconductor material waveguides matching the laser (i.e. InP waveguide with InP laser). Also, the optical connecting waveguides could be dielectric based, such as silicon dioxide, silicon nitride, etc.)

In this disclosure FIGS. 1 through 10 are employed to illustrate some basic concepts of providing input/output ports in hermetically sealed capsules for sensitive laser and polymer modulators integrated on a common platform. Various embodiments are illustrated and explained for hermetically sealing the capsule and coupled optical fiber in a variety of potential configurations to provide for different applications and/or different components. FIGS. 11 through 19 illustrate and explain specific examples of hermetically sealed capsules for sensitive laser and polymer modulators integrated on a common platform with multiple optical and electrical input/output ports and multiple optical fibers optically coupled to the optical ports in accordance with the present invention. In all instances, it should be understood that the specific examples of hermetically sealed capsules for sensitive laser and polymer modulators integrated on a common platform with multiple input/output ports and multiple optical fibers disclosed may incorporate or be replaced with some or all of the concepts set forth in FIGS. 1 through 10.

Figure 1:
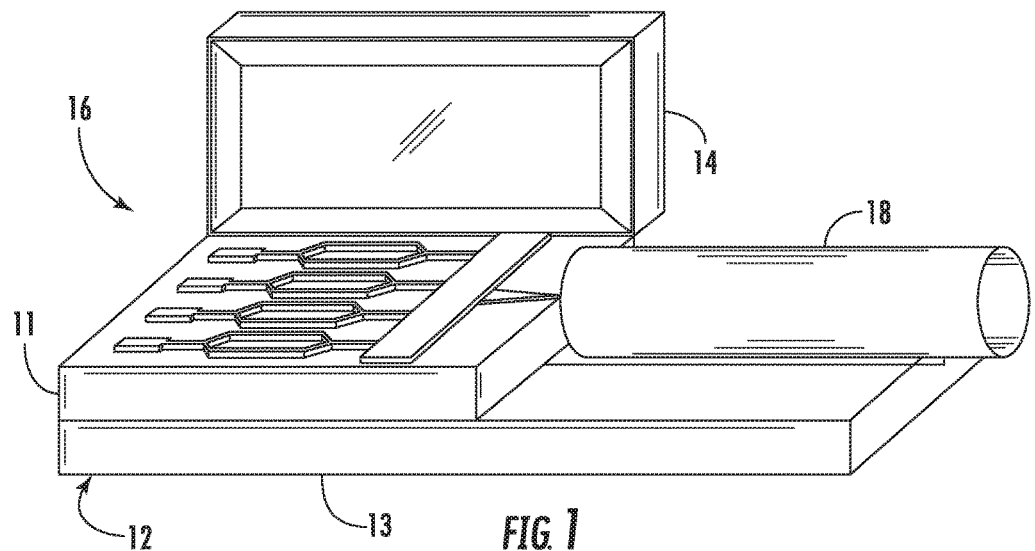
FIG. 1 is a perspective view of a basic hermetic capsule (in an open configuration to illustrate internal components) with integrated laser/polymer modulator.
Figure 1A:
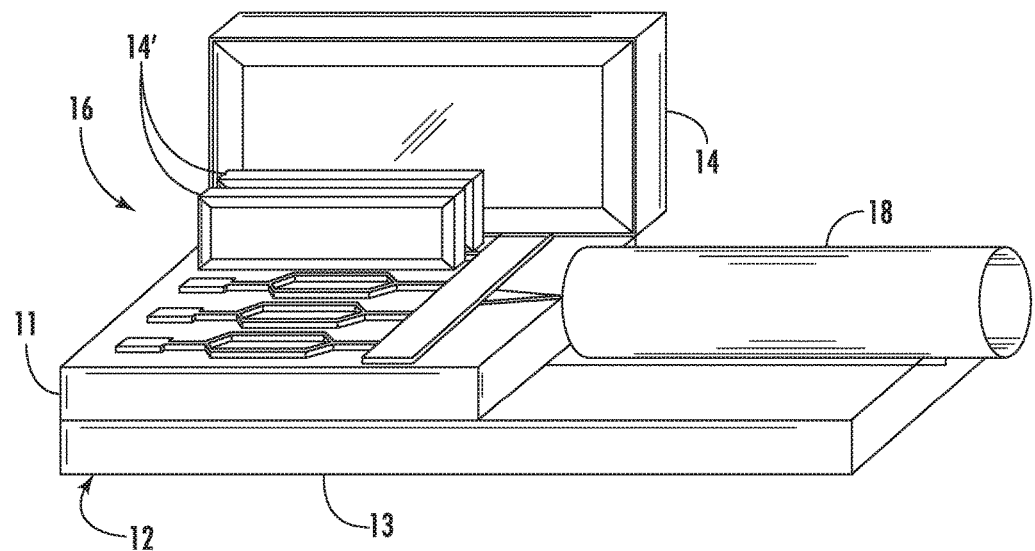
FIG. 1A is a perspective view of embedded hermetic capsules within a basic hermetic capsule (all in an open configuration to illustrate internal components) with integrated laser/polymer modulator.

Turning to FIG. 1, a basic hermetic capsule 10, including base 12 and basic lid 14, is illustrated with integrated laser/polymer modulator 16 and optical fiber 18 optically coupled to integrated laser/polymer modulator 16 to supply an optical output. For purposes of this disclosure, basic lid 14 is defined as a "basic lid" constructed to hermetically enclose all or substantially all of integrated laser/polymer modulator 16 and the combination of basic lid 14 and the hermetically sealed circuitry is defined as a "basic embedded capsule". Referring additionally to FIG. 1A, one or more smaller lids 14' are constructed to hermetically seal components of integrated laser/polymer modulator 16. For purposes of this disclosure, lid 14' is defined as an "embedded lid" and the combination of embedded lid 14' and the hermetically sealed component or components is defined as an "embedded hermetic capsule". Embedded lids 14' and basic lid 14 are illustrated in an open configuration to show integrated laser/polymer modulator 16 and the coupling of optical fiber 18.

In this disclosure, the "base" is defined as the structure carrying all of the electro-optic components, and is generally illustrated and discussed as a single platform. However, it will be understood that the base could be fabricated in a semiconductor/metal wafer, designated 11 in FIGS. 1 and 1A, which could in turn be mounted on a capsule platform, designated 13, in FIGS. 1 and 1A. Capsule platform 13 could be fabricated from silicon, GaAs, metal, plastic, or any other suitable organic or inorganic material which would serve to hold the semiconductor/metal wafer and optical fiber 18 in a fixed relationship. In applications where the base is mounted on a capsule platform, as illustrated in FIGS. 1 and 1A, some of the etching steps defining the right-hand edge of the base, described below, may not be needed.

Figure 2:
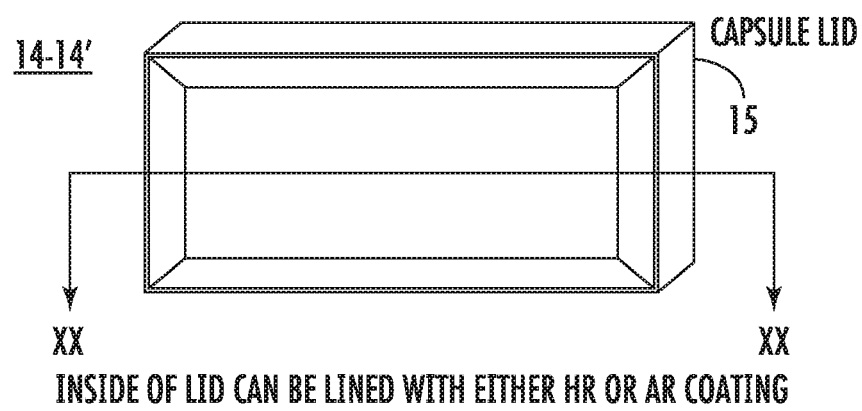
FIG. 2 is a perspective view of the lid of either an embedded hermetic capsule or a basic hermetic capsule (depending upon the size) of FIG. 1.
Figure 3A:
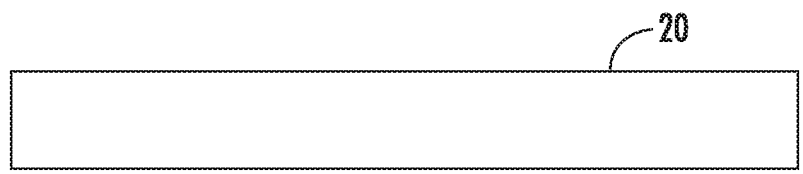
FIG. 3A through FIG. 3C illustrate several steps in a process for fabricating the lid of FIG. 2.
Figure 3B:
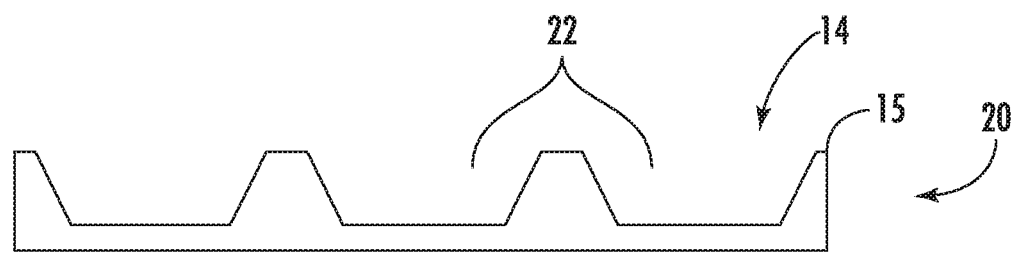
Figure 3C:
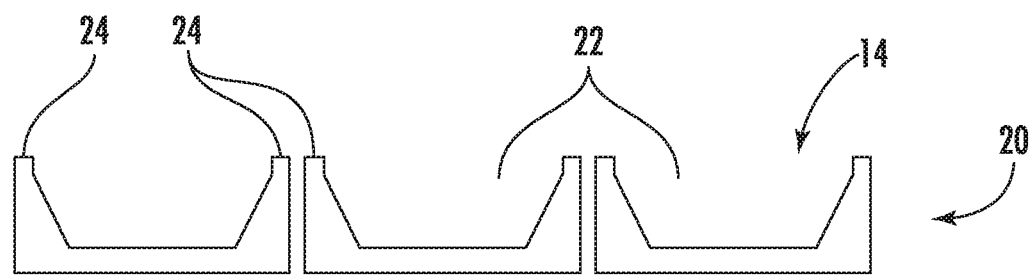

Referring to FIG. 2, lid 14 or lid 14', depending upon the size, is illustrated individually to better show fabrication steps illustrated in FIG. 3a through 3C. In the preferred embodiment, lids 14 and 14' are fabricated from the same material as base 12 and in a shell-like form to define an internal volume surrounded by a peripheral edge 15. For example, base 12 is fabricated from InP so that the laser can be fabricated monolithically (i.e. on the same wafer), as described in more detail in the above described copending patent application. Further, since base 12 and lids 14 and 14' are formed of the same material, in the preferred embodiment, the coefficient of temperature expansion (CTE) will be the same. It should be understood, however, that other wafer materials, such as GaAs, GaN, silicon, sapphire, etc., could be used to fabricate base 12 and lids 14 and 14' and in some cases, depending upon the CTE, base 12 and lids 14 and 14' might be made of different material, to reduce cost or for other reasons.

Referring additionally to FIGS. 3A, 3b, and 3C, some steps in a process of fabricating lids 14 and 14' are illustrated. FIG. 3A illustrates a wafer 20 of the material selected for lids 14 and 14'. In the process, as illustrated specifically in FIG. 3B, wafer 20 is masked, photolithographed and deep trenches 22 are etched in a two-dimensional format. Well-known wet and dry etching techniques can be used. In this fashion an array of two-dimensional trenches 22 are formed across wafer 20. As will be understood by those skilled in the art, each trench 22 defines a lid 14 or 14' hollowed out (shell-like form) to provide a volume space within the confines of edge 15. The edges 15 of each trench 22 are metallized, designated by number 24, and the array of trenches 22 is singulated into individual lids 14 or 14', as illustrated in FIG. 3C. In addition to providing hermetic sealing of lids 14 and 14' to base 12, the metallization can be used for internal protection, lid lining, reflector applications, or could be a non-reflective lining for absorption of stray light and the like. In addition to or instead of metallization of the inside of each lid 14 or 14', the inside can be lined with either a high reflective (HR) or an antireflective (AR) coating.

Here it should be noted that either or both lids 14 and 14' could be fabricated entirely from metal or they could be fabricated from plastic and metalized on either the outside, the inside, or both. Also in the preferred embodiment, either or both of the metallization of lids 14 and 14', whether the lids are semiconductor, plastic or metal, includes conductive metal specifically designed to isolate and eliminate or reduce RF (radio frequency) interference.

In the specific example illustrated in FIG. 3C lids 14 or 14' are singulated before attachment to corresponding bases 12. However, in some applications it may be more convenient to align and then simultaneously bond multiple lids 14 or 14' still connected by the continuous material (e.g. as illustrated in FIG. 3B) to corresponding bases 12 (also formed in a matching array on a second wafer). The bonded bases/lids could then be singulated into individual components.

Figure 4A:
FIG. 4A through FIG. 4M illustrate steps in the process of fabricating an embodiment of the embedded hermetic capsule within a basic hermetic capsule of FIG. 1A.

Turning now to FIG. 4A through FIG. 4M, steps for fabricating base 12, including integrated laser/polymer modulator 16 and optical fiber 18 optically coupled to integrated laser/polymer modulator 16, are illustrated. While a single base 12 is illustrated for convenience of the viewer, it should be understood that an array of bases similar to that illustrated could be formed in a wafer so as to be aligned with the array of lids illustrated in FIG. 3B. To this end, FIG. 4A through FIG. 4M, can be considered to illustrate a single one of an array of bases. Referring specifically to FIG. 4A, a semiconductor wafer 30 is provided. Wafer 30 includes InP in the preferred embodiment because a laser diode can be fabricated monolithically as a source of light for the structure. The wafer can include GaAs, GaN, silicon, etc. In the case of GaAs and GaN, monolithic emitters (lasers or LEDs) can be formed monolithically but in the case of a silicon wafer, InP, GaAS, or GaN would be grown or bonded on the silicon wafer to provide for a monolithic emitter. With further reference to FIG. 4A, semiconductor wafer 30 is modified by the growth of epi layers 32 to define laser/waveguide structures. Some laser/waveguide structures that might be formed include, for example, quantum wells, waveguide cladding layers, highly and lightly doped N and P layers, waveguide barrier layers, etc. Many or all of these structures might include InP material systems, such as InGaAs, InGaP, InGaAlAs, InGaAlP, InAsGaP, etc.

Figure 4B:
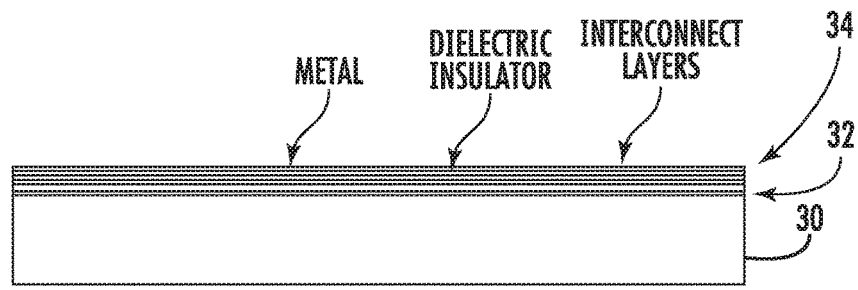

Referring specifically to FIG. 4B, semiconductor wafer 30 is further modified by depositing multiple layers of metal/dielectric material to define insulated electrical interconnect layers 34 adjacent the upper surface. Electrical interconnect layers 34 allow electrical signaling (e.g. rf, microwave, ac, dc, etc.) to pass between the integrated devices (see below) and the exterior for bonding and signaling. Further, electrical interconnect layers 34 are insulated with dielectric layers to prevent shorting, etc. with lids that are subsequently sealed to the surface of the structure.

Figure 4C:
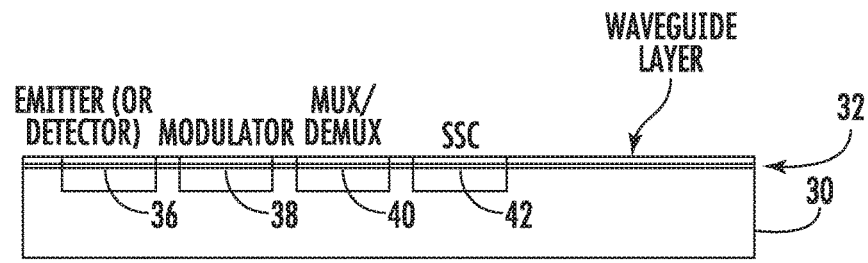

Referring specifically to FIG. 4C, photonic devices are fabricated into epi layers 32. In a preferred embodiment the photonic devices can include any or all of an emitter/detector 36, a modulator 38, a mux/demux device 40, and spot size converter 42. Also, emitter/detector 36, in the emitter form, preferably includes a laser, such as a distributed feedback (DFB) laser, a Fabry-Perot (FB) laser, a distributed Bragg reflector (DBR) laser, a tunable laser, a VCSEL (vertical cavity surface emitting laser), or any other type of semiconductor laser. Emitter/detector 36, in the detector form, preferably includes semiconductor diodes of the n-p, n-i-p, type or the like, which can be easily fabricated in the semiconductor/metal base. While the major components are listed above, the photonic devices can also include other components, such as modulators, detectors, mux, demux, waveguides, couplers, splitters, and spot size converters all in InP (in the preferred example). The modulator and at least some of the waveguide can be polymer based, e.g. a Mach-Zehnder structure, a ridge waveguide modulator, a slot modulator, a bleached waveguide modulator and modulators that not only work with signal intensity but also with phase and frequency or any modulator that can be conveniently fabricated in EO polymer based material.

Figure 4D:
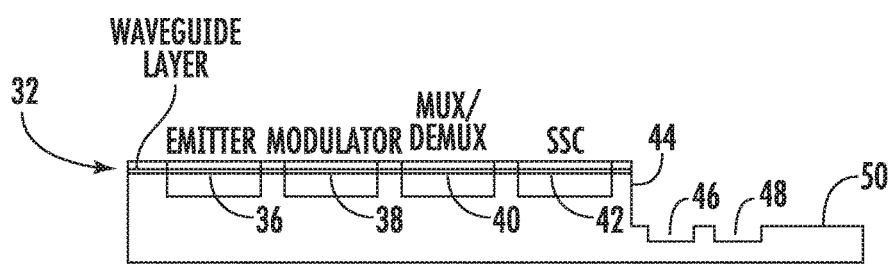
Figure 4E:
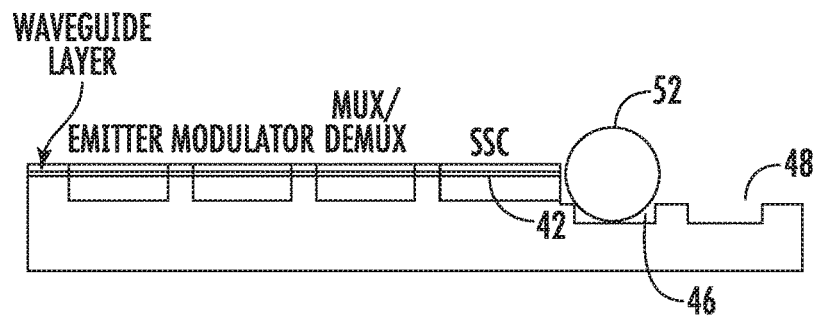
Figure 4F:
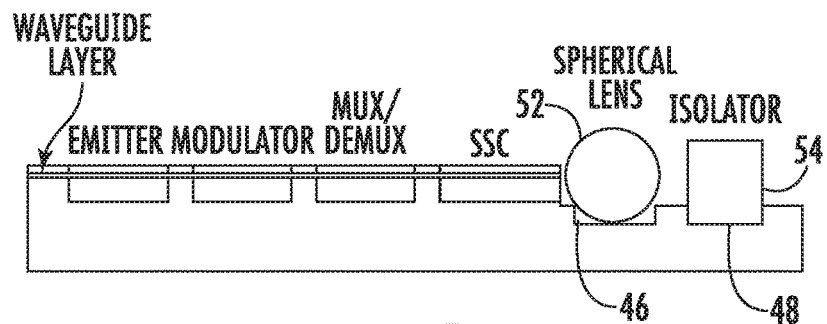

Referring specifically to FIG. 4D, semiconductor wafer 30 is fabricated for optical fiber alignment/placement and to allow for mounting of a spherical lens and/or an isolator. In this embodiment this is accomplished by etching semiconductor wafer 30 (at the right hand side in the figures) to expose the end 44 of spot size converter 42 and to form depressions 46 and 48 and an elongated V-shaped trench 50 for receiving an optical fiber therein. Referring additionally to FIG. 4E, a spherical lens 52 is fixedly mounted in depression 46 so as to be optically aligned with spot size converter 42. Referring additionally to FIG. 4F, an optical isolator 54 is fixedly mounted in depression 48 so as to be optically aligned with spherical lens 52. Optical isolator 54 allows optical signals to be collimated and aligned for delivery to an optical fiber.

Figure 4G:
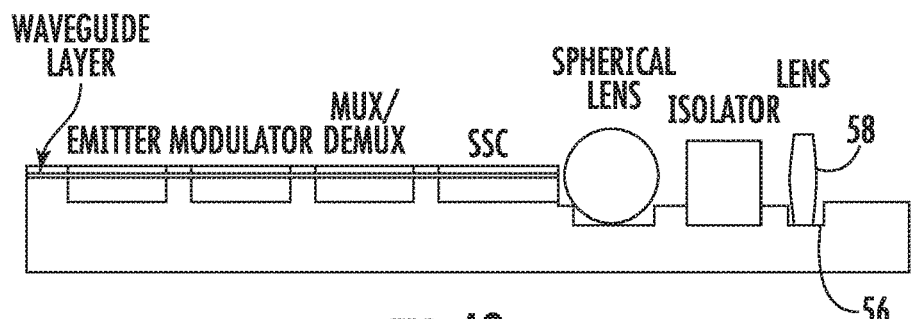
Figure 4H:
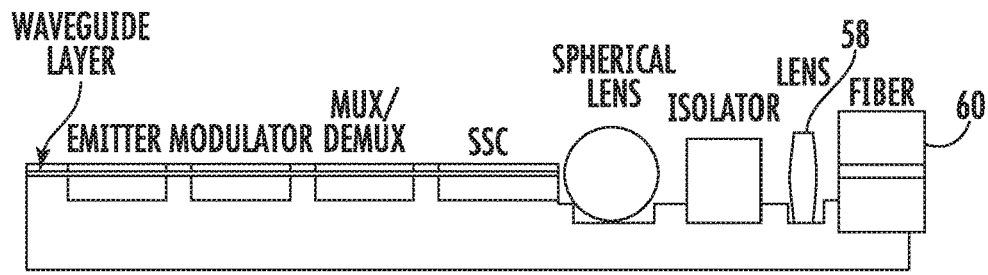

Referring additionally to FIG. 4G, an additional depression 56 is formed/etched adjacent the right hand end of semiconductor wafer 30 and an optical lens 58 is fixedly mounted therein in optical alignment with optical isolator 54. Optical lens 58 is designed to focus light to/from an optical fiber and allows optical signals to be more accurately aligned to an optical fiber. Referring additionally to FIG. 4H, one end of an optical fiber 60 is fixedly mounted in elongated V-shaped trench 50 so as to be optically aligned with optical lens 58. It will be understood that any or all of spherical lens 52, optical isolator 54, and optical lens 58 may or may not be included in any specific structure, depending upon application and other engineering factors (e.g. materials used, alignment required, etc.).

Figure 4I:
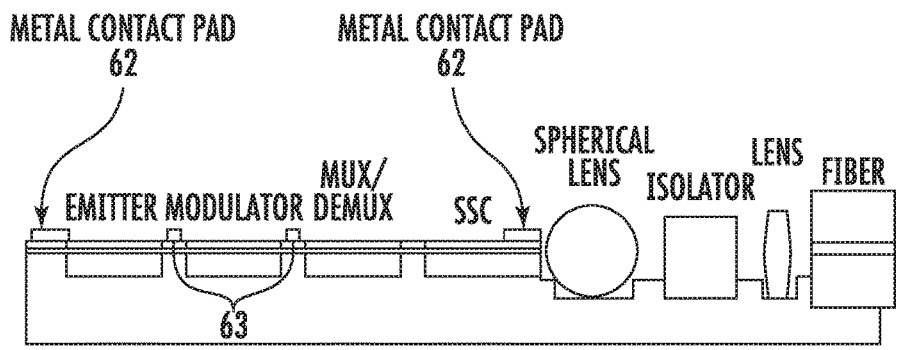
Figure 4J:
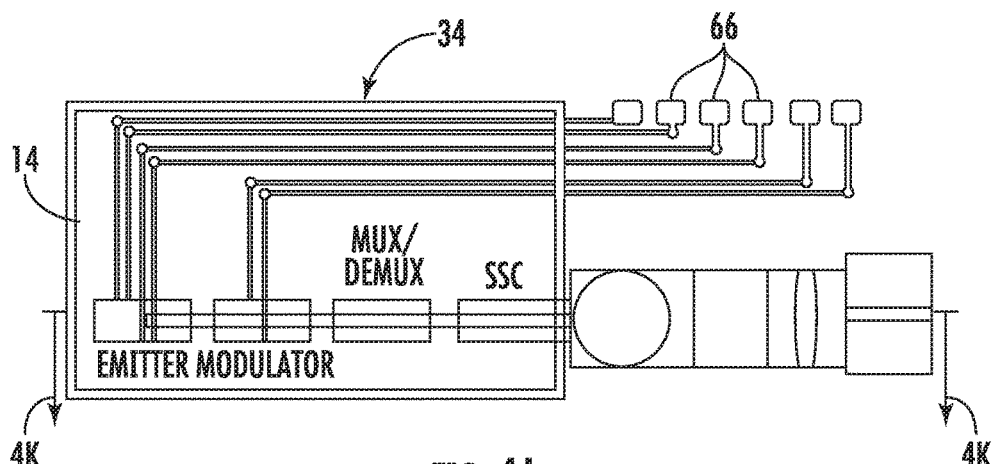
Figure 4K:
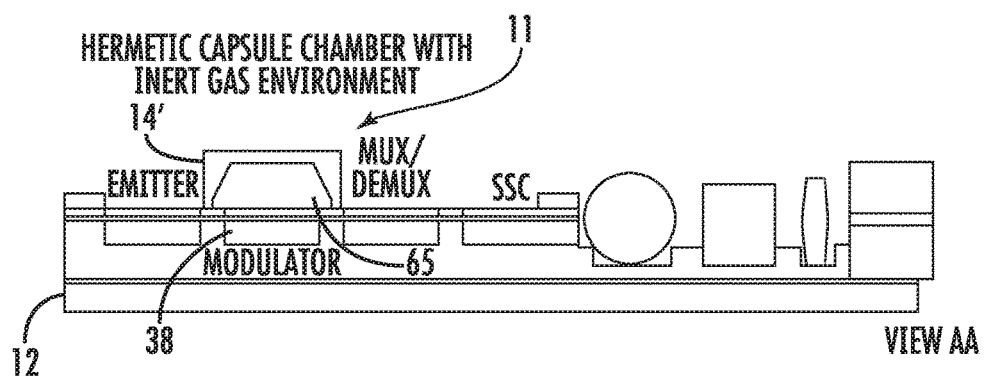

Turning to FIG. 4I, the structure of FIG. 4H is illustrated with metal contact pad 62 formed on the entire peripheral area (mating with edge 15 of lid 14), including spot size converter 42, so as to completely surround all of the photonic devices, including all of emitter/detector 36, modulator 38, mux/demux device 40, and all or nearly all of spot size converter 42. At this point contact pads 63 can also be formed to completely surround one or more components, in this example modulator 38. Metallization of contact areas (or area) 62 and 63 is preferably performed by using evaporation, ebeam, or sputtering of the metal onto the designated surface. Referring additionally to FIG. 4K, lid 14' (as metalized in FIG. 3C) is aligned and hermetically sealed to base 12 to encapsulate and hermetically seal modulator 38. A chamber 65 formed by the union of base 12 and lid 14' is preferably filled with an inert gas (e.g. nitrogen, argon, etc.) which can be introduced by aligning and sealing lid 14' in an atmosphere of the chosen inert gas. Thus, an embedded hermetic capsule, designated 11, is formed to include modulator 38.

Figure 4L:
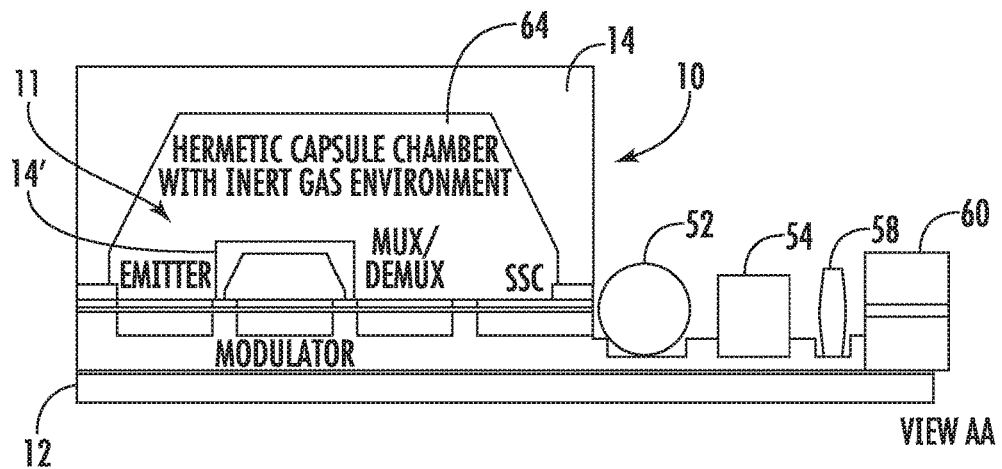

Referring additionally to FIG. 4L, lid 14 (as metalized in FIG. 3C) is aligned and hermetically sealed to base 12 to encapsulate and hermetically seal all of the sensitive semiconductor/polymer components. In this context, the term "sensitive" is defined to include any components formed of material that can be affected by the ambient (e.g. semiconductor and polymer components) while standard components of glass, etc, (e.g. spherical lens 52, isolator 54, optical lens 58, and optical fiber 60) are not sensitive and are generally not encapsulated. The metalized sealing (of both lids 14' and 14) can be accomplished, for example, via laser, seam, bonding, alloying, etc. A chamber 64 formed by the union of base 12 and lid 14 is preferably filled with an inert gas (e.g. nitrogen, argon, etc.) which can be introduced by aligning and sealing lid 14 in an atmosphere of the chosen inert gas. Thus, basic hermetic capsule, 10 is formed around all of the sensitive semiconductor/polymer components, as well as embedded hermetical capsule 11 formed to include modulator 38.

The combination of embedded hermetic capsule 11 and basic hermetic capsule 10 provide additional protection for sensitive devices and especially sensitive polymers from the environment. The combination of embedded hermetic capsule 11 and basic hermetic capsule 10 also compensate for any potential leaks in the basic hermetic capsule. Embedded hermetic capsule 11 is designed not to affect the component covered, in this example modulator 38, but the component hermetically sealed could be laser 36 plus modulator 38, modulator 38 plus waveguide, mux/demux 40, and various combinations of components included in the circuitry. Also, as illustrated in FIG. 4M, more than one embedded hermetic capsule 11 may be included within basic hermetic capsule 10.

Referring again to FIG. 4J, the position of electrical interconnect layers 34 and the various optical components are illustrated in a top view of basic hermetic capsule 10 (even though they would be hidden by basic lid 14 and overlying material) to illustrate externally accessible electrical contacts or contact pads 66 and their connections to the electrical portions of emitter/detector 36 and modulator 38. The electrical lines formed in electrical interconnect layer 34 are buried in an insulating oxide or polymer layer or layers to avoid current leakage between adjacent lines and to avoid shorting to the metallization seals of both basic lid 14 and embedded lid 14'. Thus, it can be seen that embedded hermetic capsule 11 hermetically encapsulates one or more components and basic hermetic capsule 10 hermetically encapsulates all of the various semiconductor/polymer components while allowing external electrical and optical access. In this specific embodiment, the metallization in area 62, along with spot size converter 42 defines an optical output pathway for connection to an external device, such as an optical fiber. The electrical interconnect layers 34 and externally accessible electrical contacts or contact pads 64 are applicable to all embodiments and capsule designs.

Figure 4M:
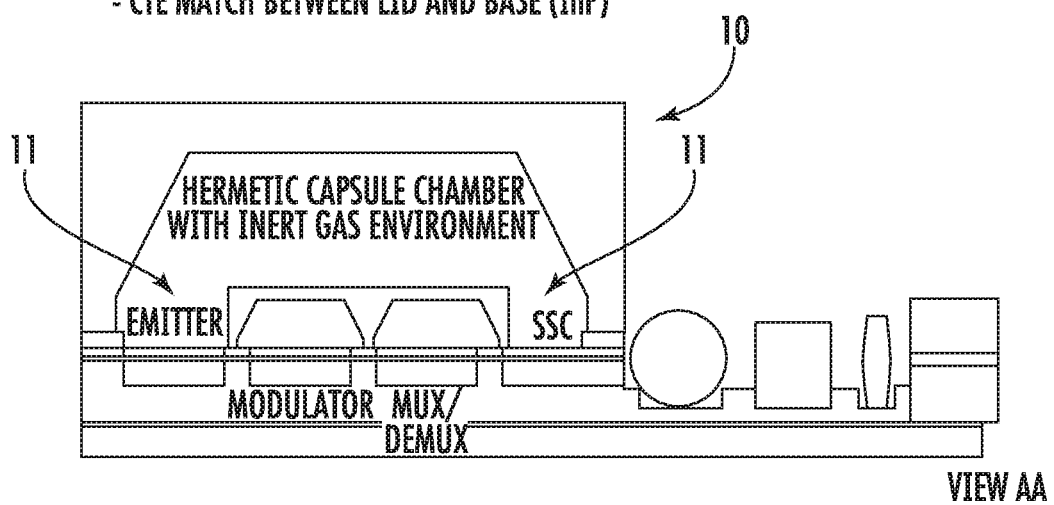
Figure 5A:
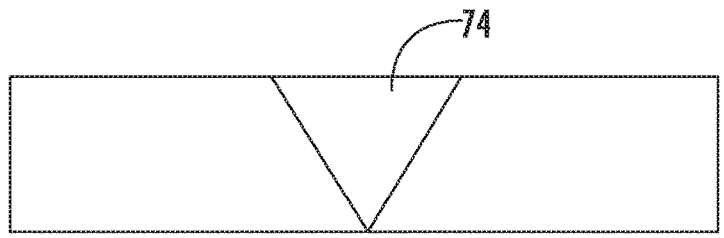
FIG. 5A through FIG. 5C illustrate steps in the process of fabricating a modification of the embedded hermetic capsule within a basic hermetic capsule of FIG. 1A.
Figure 5B:
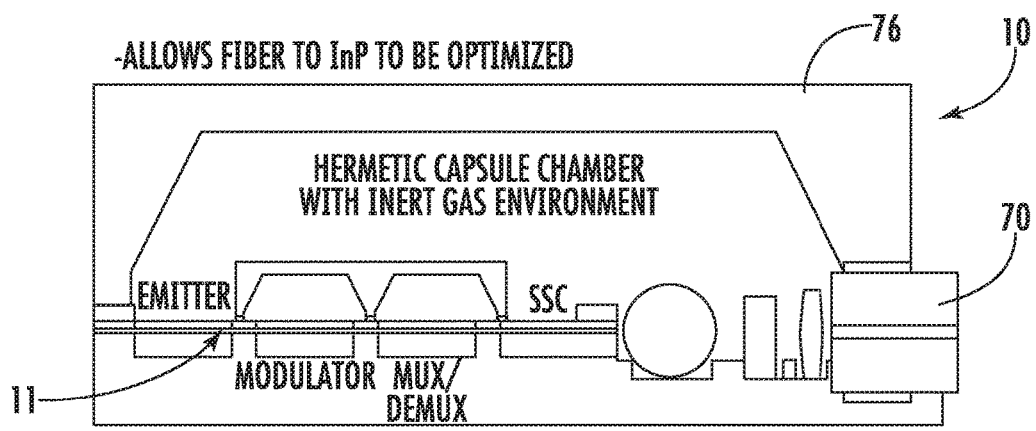
Figure 5C:
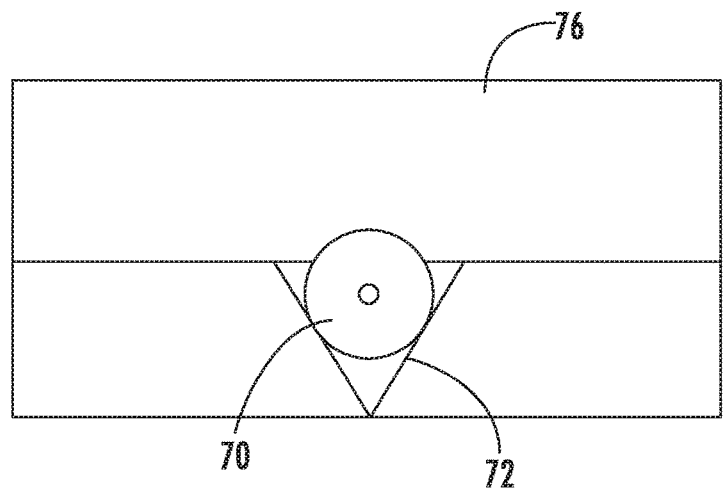

Turning to FIG. 5A, FIG. 5B, and FIG. 5C, a modification of the basic hermetic capsule 10 and embedded hermetic capsules 11 illustrated in FIG. 4M, is illustrated. In this modified structure, a metallized optical fiber 70 is positioned in a V-shaped groove 74 (see FIG. 5A). Metallized optical fiber 70 has an outer metal coating 72 (see FIG. 5C) for at least the portion lying in V-shaped groove 74. A lid 76, which is modified to extend to the right hand edge (see FIG. 5B) is metallized, generally as explained above, and hermetically seals fiber 70 into the side of the hermetic capsule. This modified basic hermetic capsule allows the optical fiber-to-InP components to be optimized. Other than the modified lid and optical fiber, the structure remains the same as described above, with one other exception, the lid is also modified to allow external electrical connections (contact pads 66) to be accessed.

Figure 6:
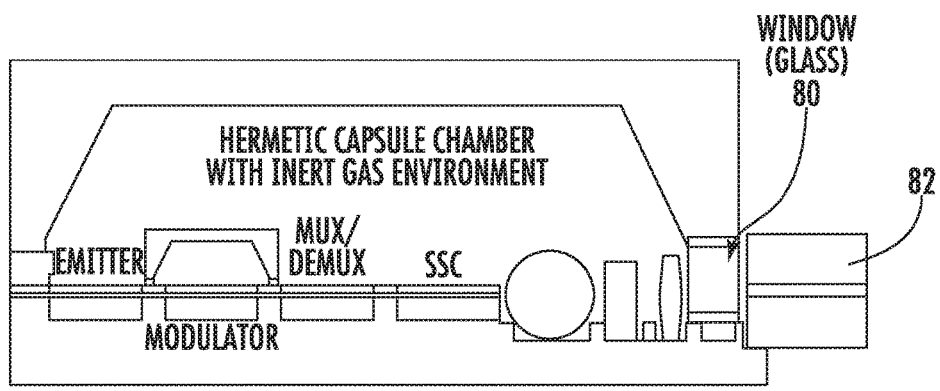
FIG. 6 illustrates another modification of the embedded hermetic capsule within a basic hermetic capsule of FIG. 1A.

Turning to FIG. 6, another modification of the basic hermetic capsule is illustrated. In this structure the base and lid are the same as illustrated in FIG. 5B but instead of enclosing a metalized optical fiber a window 80 is metalized and sealed in the right hand wall adjacent the right hand edge of the base. An optical fiber 82 is mounted in a V-groove at the right hand edge of the base and aligned to receive optical signals from the internal optics through window 80. Window 80 can be glass or any optically transparent material that preserves the hermetic seal.

Figure 7A:
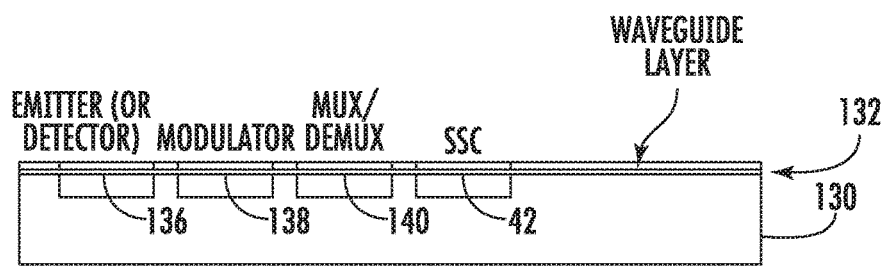
FIG. 7A through FIG. 7C illustrate steps in the process of fabricating another modification of the embedded hermetic capsule within a basic hermetic capsule of FIG. 1A.
Figure 7B:
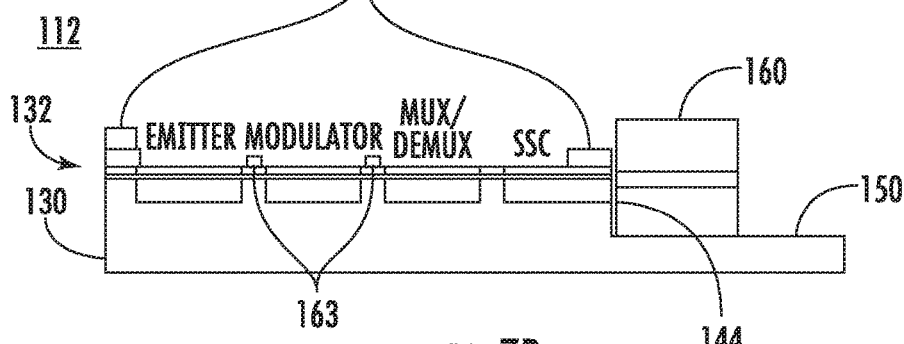
Figure 7C:
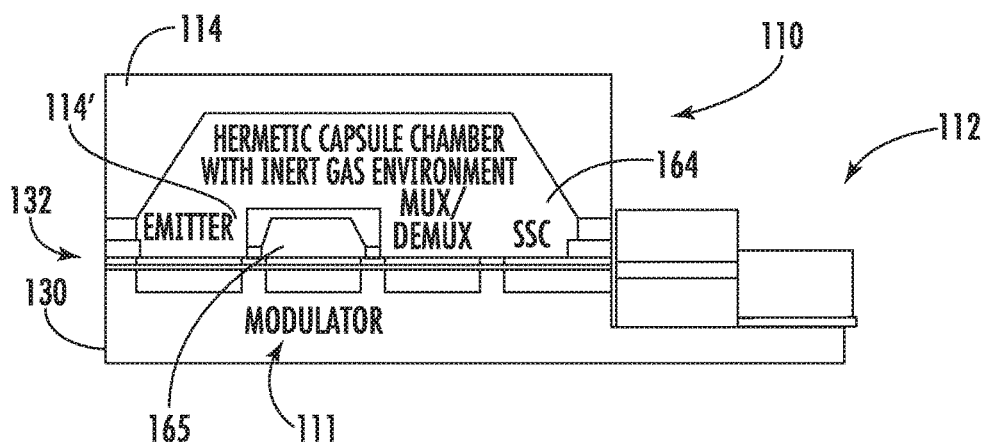

Referring to FIG. 7A, FIG. 7B, and FIG. 7C, a simplified modification is illustrated, which can be used in some specific applications. In this example, steps for fabricating a base 112, include providing a semiconductor wafer 130 and modifying base 112 by the growth of epi layers 132 to define laser/waveguide structures similar to that described in FIG. 4A above. Referring specifically to FIG. 7A, photonic devices are fabricated into epi layers 132. In this preferred embodiment the photonic devices can include any or all of an emitter/detector 136, a modulator 138, a mux/demux device 140, and spot size converter 142. Also, emitter/detector 136, in the emitter form, preferably includes a laser, such as a distributed feedback (DFB) laser, a Fabry-Perot (FB) laser, a distributed Bragg reflector (DBR) laser, a tunable laser, a VCSEL (vertical cavity surface emitting laser), or any other type of semiconductor laser. While the major components are listed above, the photonic devices can also include other components, such as modulators, detectors, mux, demux, waveguides, couplers, splitters, and spot size converters all in InP (in the preferred example). The modulator and at least some of the waveguide can be polymer based, e.g. a Mach-Zehnder structure.

Referring specifically to FIG. 7B another step in the process includes etching semiconductor wafer 130 (at the right hand side in FIG. 7B) to expose an end 144 of spot size converter 142 and to form an elongated V-shaped trench 150 for receiving an optical fiber 160 therein. In this modification, spherical lens 52, isolator 54, and lens 58 (see FIG. 4H) are not used and optical fiber 160 is butted directly against and optically aligned with end 144 of spot size converter 142. Metal contact pad 162 is formed on the peripheral area, including spot size converter 142, so as to completely surround all of the photonic devices, including all of emitter/detector 136, modulator 138, mux/demux device 140, and all or substantially all of spot size converter 142. At this point contact pads 163 can also be formed to completely surround one or more components, in this example modulator 138.

Metallization of contact areas 162 and 163 is preferably performed by using evaporation, ebeam, or sputtering of the metal onto the designated surface. Referring additionally to FIG. 7C, lid 114' (as metalized in FIG. 3C) is aligned and hermetically sealed to base 112 to encapsulate and hermetically seal modulator 138 to form embedded hermetic capsule 111. Lid 114 (as metalized in FIG. 3C) is aligned and hermetically sealed to base 112 to encapsulate and hermetically seal all of the semiconductor/polymer components, as well as embedded hermetic capsule 111 to form basic hermetic capsule 110. The metalized sealing can be accomplished, for example, via laser, seam, bonding, alloying, etc. A chamber 165 formed by the union of lid 114' and base 112 and a chamber 164 formed by the union of base 112 and lid 114 are preferably filled with an inert gas (e.g. nitrogen, argon, etc.) which can be introduced by aligning and sealing lids 114' and 114, individually in an atmosphere of the chosen inert gas.

Figure 8A:
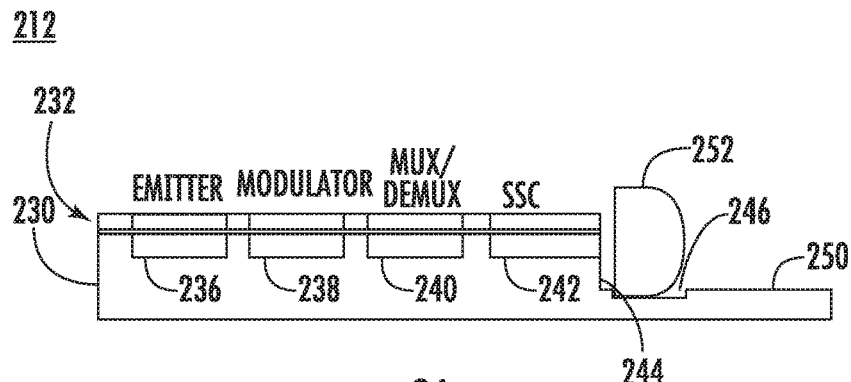
FIG. 8A through FIG. 8D illustrate steps in the process of fabricating another modification of the embedded hermetic capsule within a basic hermetic capsule of FIG. 1A.
Figure 8B:
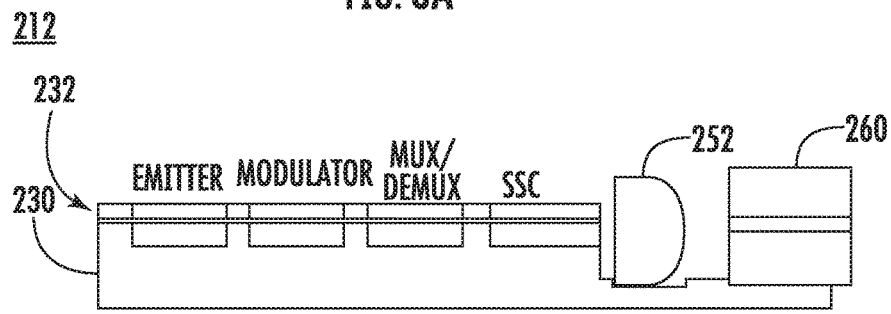

Referring to FIG. 8A, FIG. 8B, FIG. 8C, and FIG. 8D, another modification is illustrated, which can be used in some specific applications. In this example, steps for fabricating a base 212, include providing a semiconductor wafer 230 and modifying base 212 by the growth of epi layers 232 to define laser/waveguide structures similar to that described in FIG. 4A above. Referring specifically to FIG. 8A, photonic devices are fabricated into epi layers 232. In this preferred embodiment the photonic devices can include any or all of an emitter/detector 236, a modulator 238, a mux/demux device 240, and spot size converter 242. Also, emitter/detector 236, in the emitter form, preferably includes a laser, such as a distributed feedback (DFB) laser, a Fabry-Perot (FB) laser, a distributed Bragg reflector (DBR) laser, a tunable laser, a VCSEL (vertical cavity surface emitting laser), or any other type of semiconductor laser. While the major components are listed above, the photonic devices can also include other components, such as modulators, detectors, mux, demux, waveguides, couplers, splitters, and spot size converters all in InP (in the preferred example). The modulator and at least some of the waveguide can be polymer based, e.g. a Mach-Zehnder structure.

Still referring to FIG. 8A, another step in the process includes etching semiconductor wafer 230 (at the right hand side in FIG. 8A) to expose an end 244 of spot size converter 242 and to form depression 246 and to form an elongated V-shaped trench 250 for receiving an optical fiber 260 therein. In this modification, spherical lens 52, isolator 54, and lens 58 (see FIG. 4H) are not used and an optical focusing lens 252 (in the preferred example a GRIN type lens) is fixedly engaged in depression 246 and optically aligned with the output/input of spot size converter 242. As illustrated specifically in FIG. 8B, optical fiber 260 is engaged in V-shaped groove 250 and optically aligned with optical focusing lens 252.

Figure 8C:
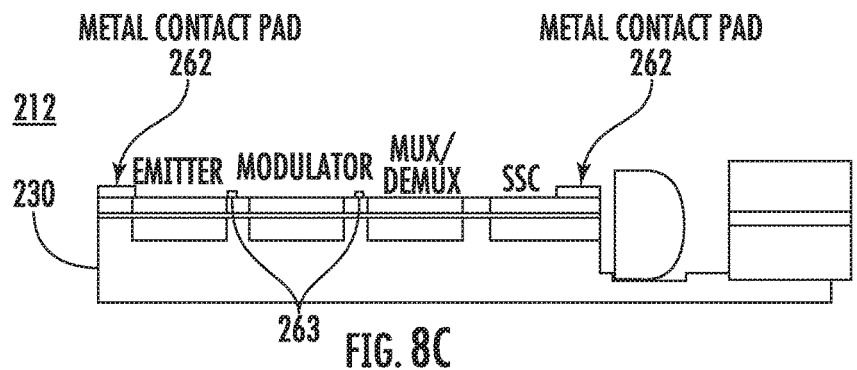
Figure 8D:
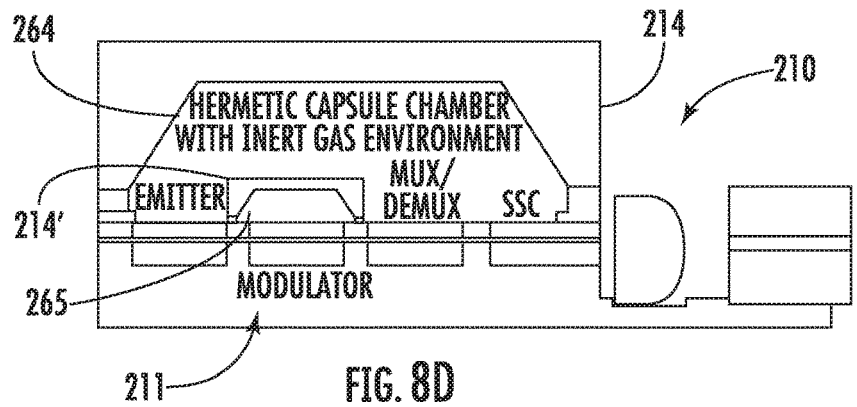

Referring specifically to FIG. 8C, metal contact pad 262 is formed on the peripheral area, including spot size converter 242, so as to completely surround all of the photonic devices, including all of emitter/detector 236, modulator 238, mux/demux device 240, and all or substantially all of spot size converter 242. At this point contact pads 263 can also be formed to completely surround one or more components, in this example modulator 238. Metallization of contact areas 262 and 263 are preferably performed by using evaporation, ebeam, or sputtering of the metal onto the designated surface. Referring additionally to FIG. 8D, lid 114' (as metalized in FIG. 3C) is aligned and hermetically sealed to base 112 to encapsulate and hermetically seal modulator 238 to form embedded hermetic capsule 211. Lid 214 (as metalized in FIG. 3C) is aligned and hermetically sealed to base 212 to encapsulate and hermetically seal all of the semiconductor/polymer components to form basic hermetic capsule 210. The metalized sealing can be accomplished, for example, via laser, seam, bonding, alloying, etc. A chamber 265 formed by the union of base 212 and lid 214' and a chamber 264 formed by the union of base 212 and lid 214 are preferably filled with an inert gas (e.g. nitrogen, argon, etc.) which can be introduced by aligning and sealing lids 214' and 214, individually, in an atmosphere of the chosen inert gas.

Figure 9:
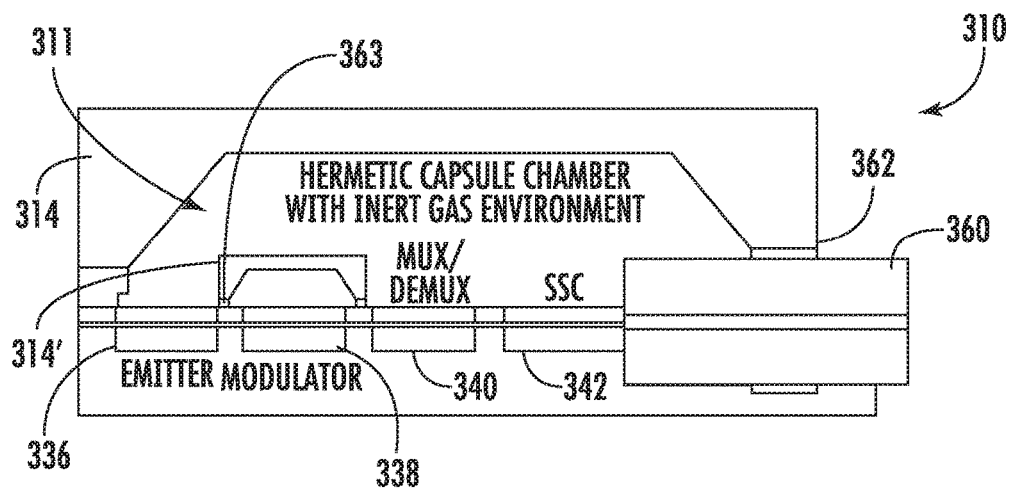
FIG. 9 illustrates another modification of the embedded hermetic capsule within a basic hermetic capsule of FIG. 1A.

A potential modification to the structure illustrated FIG. 7C, is illustrated in FIG. 9. In this modification, metal contact pad 362 is formed on the peripheral area, including optical fiber 360 (instead of spot size converter 342), so as to completely surround all of the photonic devices, including all of emitter/detector 336, modulator 338, mux/demux device 340, and spot size converter 342 and provide basic hermetic capsule 310. Also, metal contact pad 363 is formed on the peripheral area surrounding modulator 338 and lid 314' is aligned and sealed to provide embedded hermetic capsule 311 within basic hermetic capsule 310.

Figure 10:
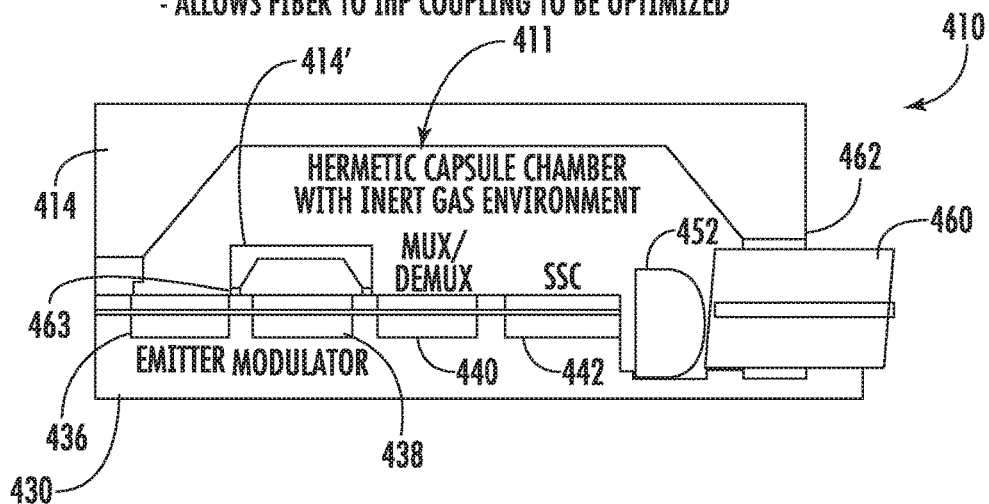
FIG. 10 illustrates another modification of the embedded hermetic capsule within a basic hermetic capsule of FIG. 1A.

A potential modification to the structure illustrated FIG. 8D, is illustrated in FIG. 10. In this modification, metal contact pad 462 is formed on the peripheral area, including optical fiber 460 (instead of spot size converter 442), so as to completely surround all of the photonic devices, including all of emitter/detector 436, modulator 438, mux/demux device 440, and spot size converter 442 and provide basic hermetic capsule 410. Also, metal contact pad 463 is formed on the peripheral area surrounding modulator 438 and lid 414' is aligned and sealed to provide embedded hermetic capsule 411 within basic hermetic capsule 410.

As explained briefly above, FIGS. 11 through 19 illustrate and explain specific examples of hermetically sealed capsules for sensitive laser and polymer modulators integrated on a common platform with multiple optical and electrical input/output ports and multiple optical fibers optically coupled to the optical ports in accordance with the present invention. In all instances, it should be understood that the specific examples of hermetically sealed capsules for sensitive laser and polymer modulators integrated on a common platform with multiple input/output ports and multiple optical fibers disclosed may incorporate or be replaced with some or all of the concepts set forth in FIGS. 1 through 10.

Figure 11:
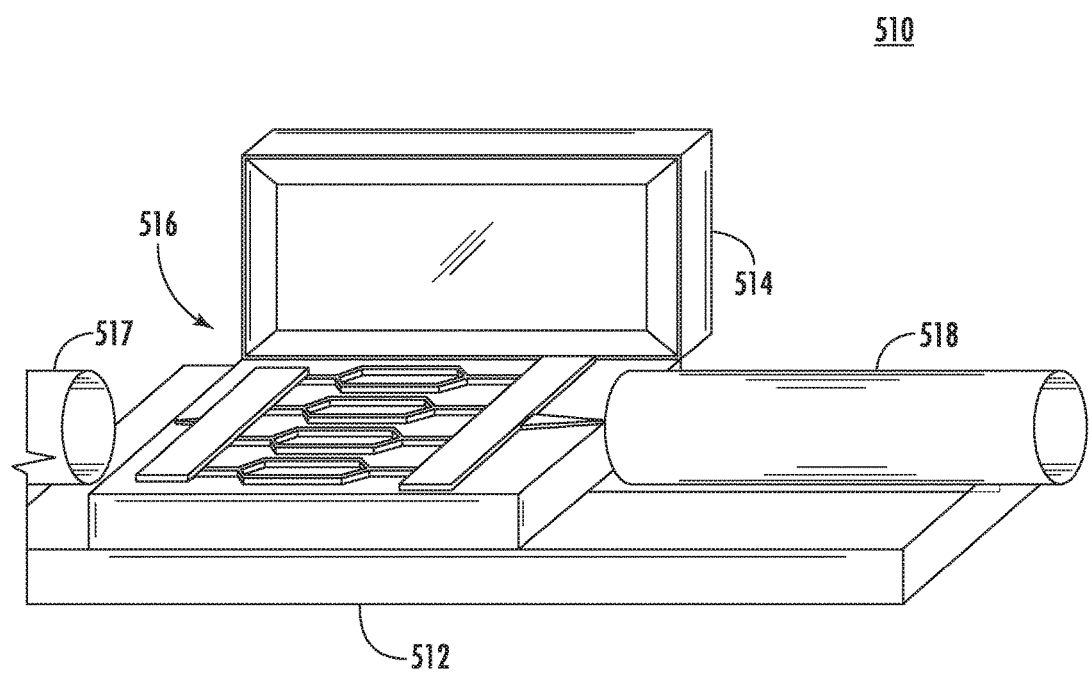
FIG. 11 illustrates a basic hermetic capsule with an input port, an output port, and optical fibers optically coupled to the ports, in accordance with the present invention.

Turning to FIG. 11, a basic hermetic capsule 510 with an optical input port, an optical output port, and optical fibers 517 and 518, respectively, optically coupled to the optical ports, in accordance with the present invention. Basic hermetic capsule 510, includes a base (wafer, etc.) 512 and a basic lid 514, in an open orientation to illustrate the inner components. Basic hermetic capsule 510 is illustrated with an integrated laser/polymer modulator 516, an optical fiber 517 optically coupled to an optical input, and an optical fiber 518 optically coupled to an optical output to integrated laser/polymer modulator 516. For purposes of this disclosure, basic lid 514 is defined as a "basic lid" constructed to hermetically enclose all or substantially all of integrated laser/polymer modulator 516 and the combination of basic lid 514 and the hermetically sealed circuitry is defined as a "basic embedded capsule".

Figure 12:
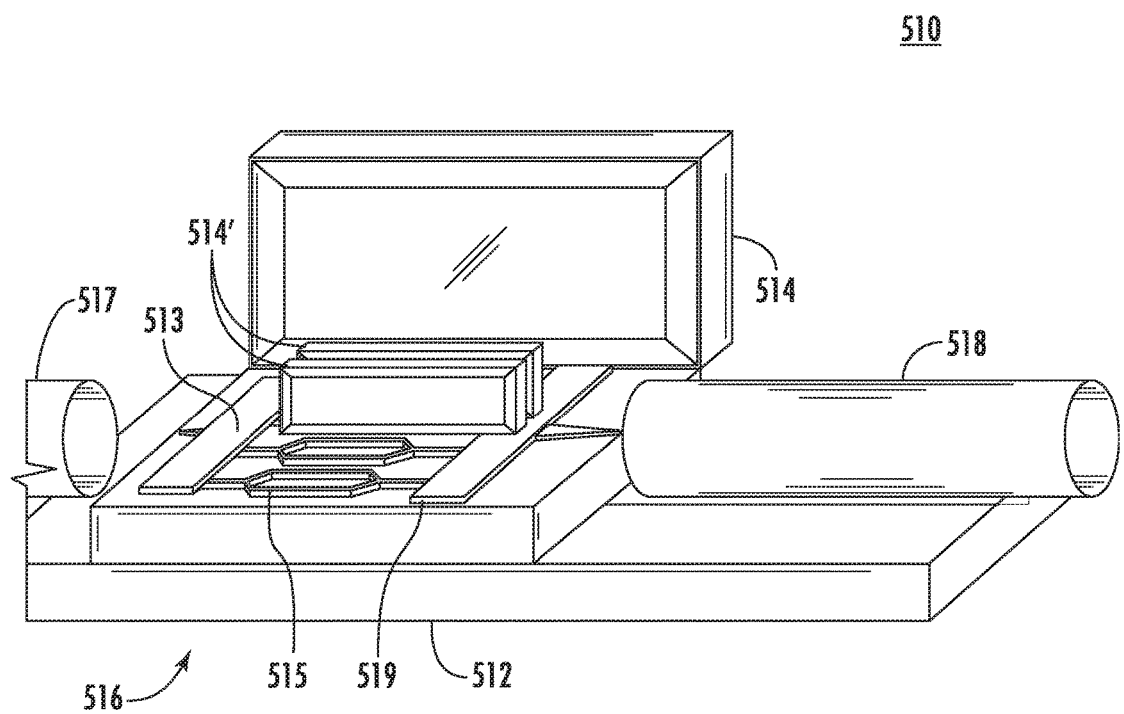
FIG. 12 illustrates an embedded hermetic capsule within a basic hermetic capsule with an input port, an output port, and optical fibers optically coupled to the ports, in accordance with the present invention.

Turning to FIG. 12, a basic hermetic capsule 510 is illustrated including a base (wafer, etc.) 512 and a basic lid 514 with one or more, smaller lids 514' which are constructed to hermetically seal components of integrated laser/polymer modulator 516. For purposes of this disclosure, lids 514' are defined as "embedded lids" and the combination of embedded lids 514' and the hermetically sealed component or components is defined as an "embedded hermetic capsule". Embedded lids 514' and basic lid 514 are illustrated in an open configuration to show integrated laser/polymer modulator 516 and the coupling of optical fibers 517 and 518. In this example, optical fiber 517 is optically coupled through an optical input to an integrated circuit 513 which may include, for example, spot size converters or other optical components. Integrated circuit 513 is in turn optically coupled through waveguides to a plurality of Mach-Zehnder modulators 515. The outputs of Mach-Zehnder modulators 515 are coupled to a Mux/demux circuit which is coupled through a spot size converter (SSC) output, designated in combination 519, to optical fiber 518. Thus, one or more light beams are introduced to the plurality of Mach-Zehnder modulators 515 which modulate the light beams and send the modulated light beams out through mux/demux circuit 519 to output optical fiber 518.

Figure 13:
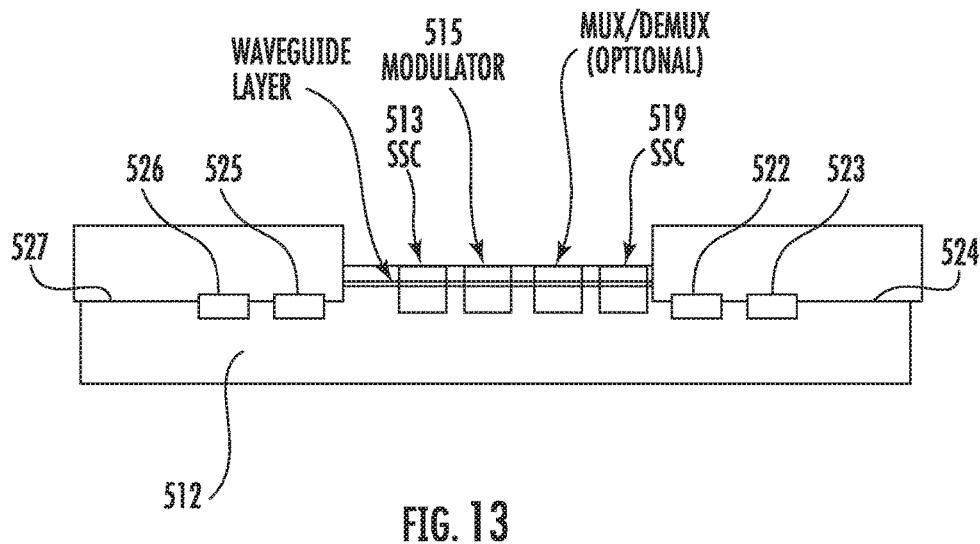
FIGS. 13, 14, and 15 illustrate steps in a process of fabricating embedded hermetic capsules within a basic hermetic capsule with an input port, an output port, and optical fibers optically coupled to the ports, in accordance with the present invention.
Figure 14:
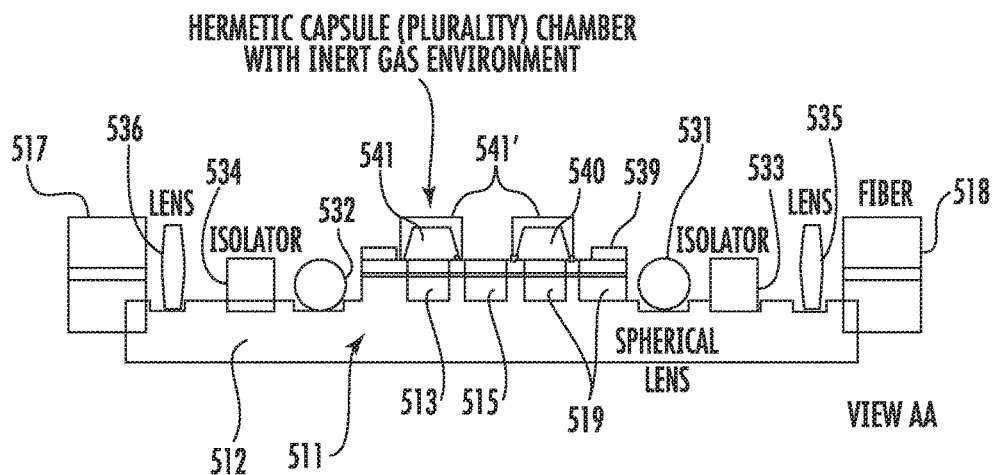
Figure 15:
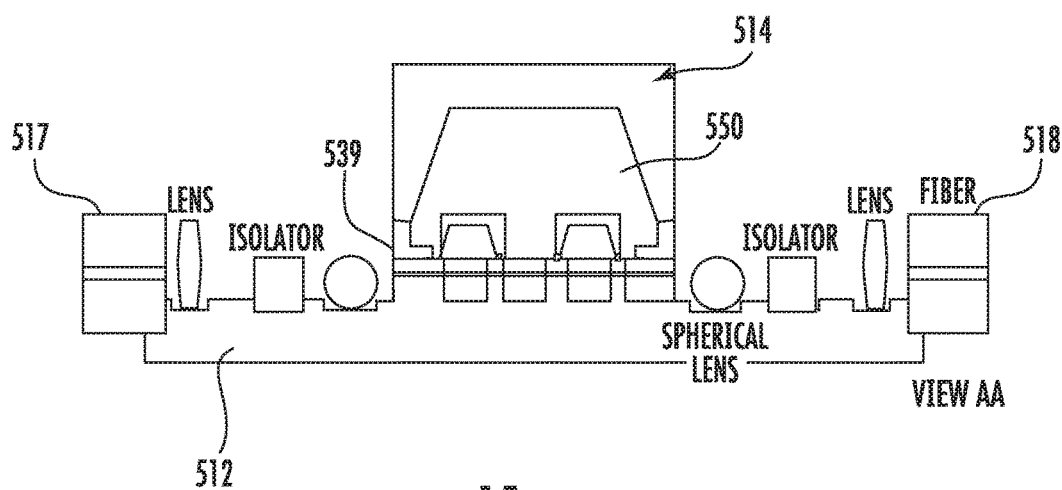

Turning to FIGS. 13, 14, and 15, some steps in the fabrication of basic hermetic capsule 510 are illustrated. Generally, wafer 512 is initially processed as described above with relation to FIGS. 4A through 4D. Semiconductor wafer 512 is fabricated for optical fiber alignment/placement and to allow for mounting of a spherical lens and/or an isolator. In this example semiconductor wafer 512 is etched (at both sides in the figures) to expose the ends of spot size converters 513 and 519 and to form depressions 522 and 523 and an elongated V-shaped trench 524 on the right-hand side in FIG. 13 and depressions 525 and 526 and an elongated V-shaped trench 527 on the left-hand side in FIG. 13.

Referring additionally to FIG. 14, spherical lenses 531 and 532 are fixedly mounted in depressions 522 and 525, respectively, so as to be optically aligned with spot size converters 519 and 513, respectively. Optical isolators 533 and 534 are fixedly mounted in depressions 523 and 526, respectively, so as to be optically aligned with spherical lenses 531 and 532, respectively. Optical isolators 533 and 534 allow optical signals to be collimated and aligned for delivery to an optical fiber. Additional depressions are formed/etched adjacent both the right-hand end and the left-hand edge of semiconductor wafer 512 and optical lenses 535 and 536 are fixedly mounted therein in optical alignment with optical isolators 533 and 534, respectively. Optical lenses 535 and 536 are designed to focus light to/from an optical fiber and allows optical signals to be more accurately aligned to an optical fiber. One end of optical fiber 518 is fixedly mounted in elongated V-shaped trench 527 so as to be optically aligned with optical lens 535 and one end of optical fiber 517 is fixedly mounted in elongated V-shaped trench 524 so as to be optically aligned with optical lens 536. Also, metallization in rectangular area 539 is provided for the mounting and sealing of lid 514. It will be understood that any or all of spherical lenses 531 and 532, optical isolators 533 and 534, and optical lenses 535 and 536 may or may not be included in any specific structure, depending upon application and other engineering factors (e.g. materials used, alignment required, etc.).

With further reference to FIG. 14, one lid 514' (as metalized in FIG. 3C) is aligned and hermetically sealed to base 512 to encapsulate and hermetically seal spot size converters 513 and another lid 514' (as metalized in FIG. 3C) is aligned and hermetically sealed to base 512 to encapsulate and hermetically seal spot size converters 519. Chambers 540 and 541 formed by the union of base 512 and lids 514' are preferably filled with an inert gas (e.g. nitrogen, argon, etc.) which can be introduced by aligning and sealing lids 514' in an atmosphere of the chosen inert gas. Thus, embedded hermetic capsules, designated 511, are formed to include sensitive components.

Referring additionally to FIG. 15, lid 514 (as metalized in FIG. 3C) is aligned and hermetically sealed to base 512 to encapsulate and hermetically seal all of the sensitive semiconductor/polymer components. In this context, the term "sensitive" is defined to include any components formed of material that can be affected by the ambient (e.g. semiconductor and polymer components) while standard components of glass, etc, (e.g. spherical lenses 531 and 532, isolators 533 and 534, optical lenses 535 and 536, and optical fibers 517 and 518) are not sensitive and are generally not encapsulated. The metalized sealing (of both lids 514' and 514) can be accomplished, for example, via laser, seam, bonding, alloying, etc. A chamber 550 formed by the union of base 512 and lid 514 is preferably filled with an inert gas (e.g. nitrogen, argon, etc.) which can be introduced by aligning and sealing lid 514 in an atmosphere of the chosen inert gas. Thus, basic hermetic capsule, 510 is formed around all of the sensitive semiconductor/polymer components, as well as embedded hermetic capsules 511.

Figure 16:
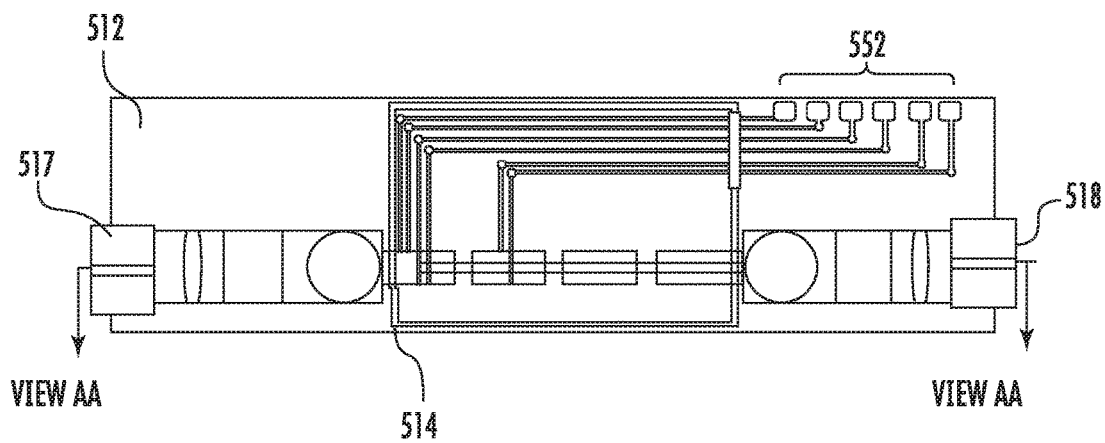
FIG. 16 is a top plan view of the hermetic capsule of FIG. 15 further illustrating the external electrical connections, in accordance with the present invention.

Referring additionally to FIG. 16, the position of electrical interconnect layers 34 and the various optical components are illustrated in a top view of basic hermetic capsule 510 (even though they would be hidden by basic lid 514 and overlying material) to illustrate externally accessible electrical contacts (ports) or contact pads 552 and their connections to the electrical portions of components 513, 519 (if any), and modulators 515. The electrical lines formed in electrical interconnect layer 34 are buried in an insulating oxide or polymer layer or layers to avoid current leakage between adjacent lines and to avoid shorting to the metallization seals of both basic lid 514 and embedded lids 514'. Thus, it can be seen that embedded hermetic capsule 511 hermetically encapsulates one or more components and basic hermetic capsule 510 hermetically encapsulates all of the various semiconductor/polymer components while allowing external electrical and optical access. In this specific embodiment, the metallization in area 539 defines optical output pathways for connection to external devices, such as optical fibers 517 and 518. The electrical interconnect layers 34 and externally accessible electrical contacts or contact pads 552 are applicable to all embodiments and capsule designs.

Figure 17:
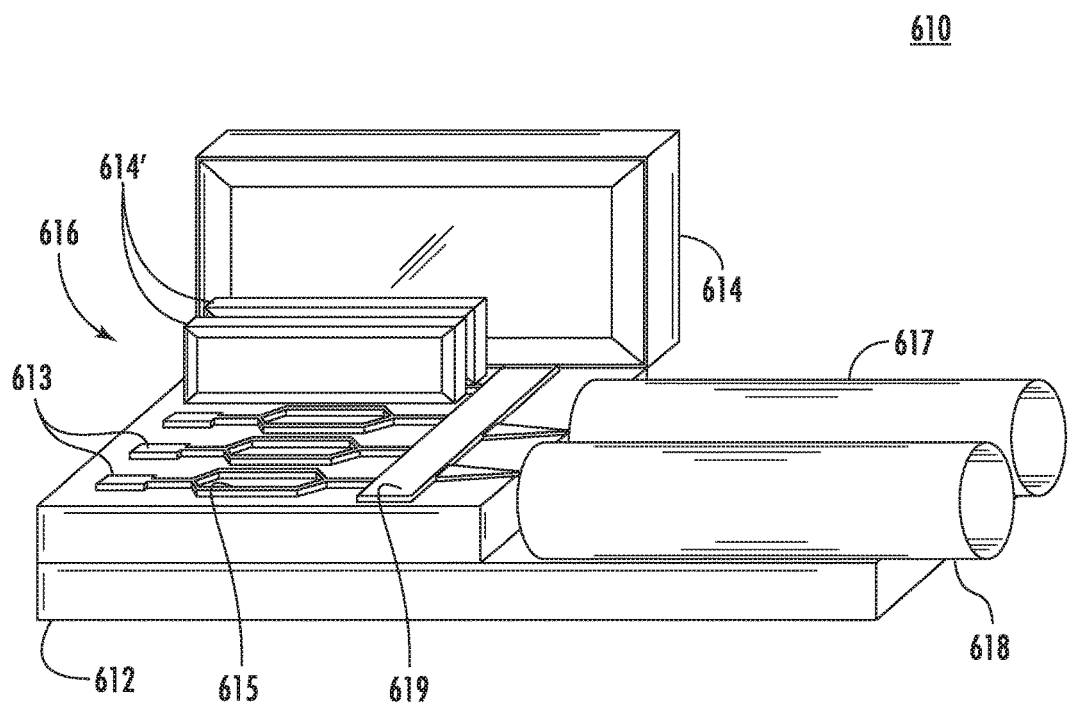
FIG. 17 illustrates embedded hermetic capsules within a basic hermetic capsule with multiple output ports, and optical fibers optically coupled to the ports, in accordance with the present invention.

Turning to FIG. 17, a base 612 is illustrated with a plurality of lasers 613 coupled, one each, to a plurality of modulators 615 (in this example Mach-Zehnder modulators) defining a plurality of monolithic photonic integrated circuits. Base 612 further includes one or more (in this example two) embedded hermetic capsules (i.e. lids 614' in the closed or sealed orientation} each hermetically sealing a single monolithic photonic integrated circuit or integrated laser/polymer modulator 616. A basic hermetic capsule 610 with multiple optical output ports, and multiple optical fibers 617 and 618 optically coupled to the optical ports is illustrated, in accordance with the present invention. Basic hermetic capsule 610 is illustrated including base (wafer, etc.) 612 and a basic lid 614 and the one or more, smaller embedded lids 614'. For purposes of this disclosure, lids 614' are defined as "embedded lids" and the combination of embedded lids 614' and the hermetically sealed component or components is defined as an "embedded hermetic capsule". Embedded lids 614' and basic lid 614 are illustrated in an open configuration to show integrated laser/polymer modulator 616 and the coupling of optical fibers 617 and 618. In this example, optical fiber 617 is optically coupled to one output of an output circuit 619, such as a mux/demux, SSC or the like. Output circuit 619 is in turn optically coupled through waveguides to the plurality of Mach-Zehnder modulators 615 in integrated laser/polymer modulator 616. Optical fiber 618 is optically coupled to another optical output of output circuit 619 which is in turn optically coupled through waveguides to the plurality of Mach-Zehnder modulators 615 in integrated laser/polymer modulator 616. Thus, lasers 613 introduced one or more light beams to the plurality of Mach-Zehnder modulators which modulate the light beams and send the modulated light beams out through mux/demux circuit 619 to output optical fiber 617 and 618.

Figure 18:
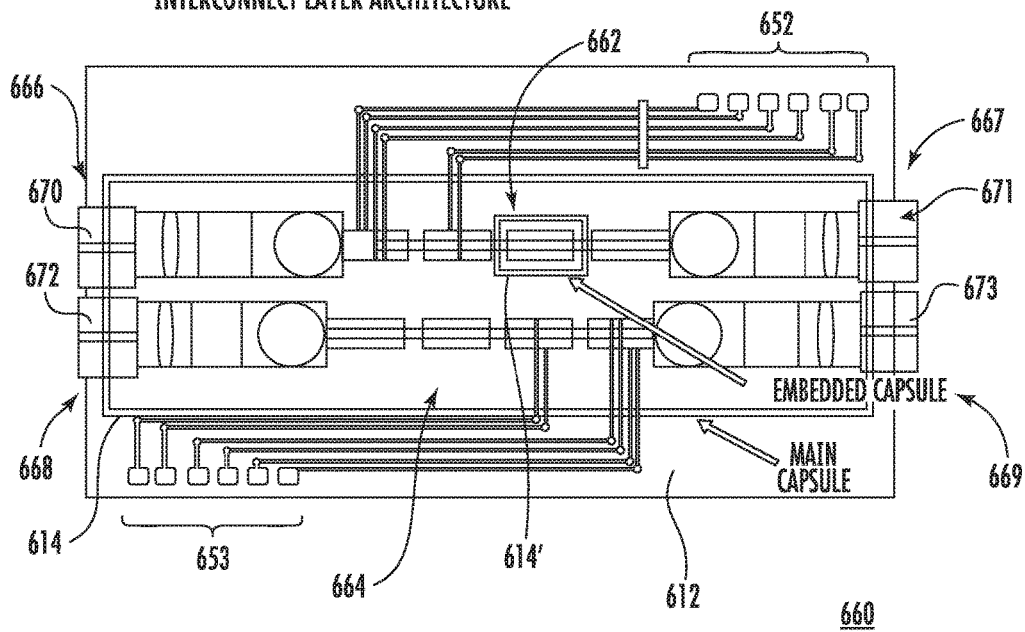
FIG. 18 is a top plan view of the hermetic capsule of FIG. 17 further illustrating the external electrical connections, in accordance with the present invention.

Referring additionally to FIG. 18, the position of electrical interconnect layers 34 and the various optical components are illustrated in a top view of a basic hermetic capsule 660 (even though they would be hidden by basic lid 614 and overlying material) to illustrate externally accessible electrical contacts (ports) or contact pads 652 and 653. In this specific example, a basic hermetic capsule 660 includes a first integrated laser/polymer modulator 662 and a second integrated laser/polymer modulator 664. Externally accessible electrical contacts or contact pads 652 are electrically connected to the laser and modulator (as well as any other electrical components) of first integrated laser/polymer modulator 662 and externally accessible electrical contacts (ports) or contact pads 653 are electrically connected to the laser and modulator (as well as any other electrical components) of second integrated laser/polymer modulator 664. First integrated laser/polymer modulator 662 includes an optical input 666 and an optical output 667 and second integrated laser/polymer modulator 664 includes an optical input 668 and an optical output 669. In this specific example the optical inputs and outputs are illustrated as including some or all of the optical components described in conjunction with FIG. 14, although it should be understood that any of the optical inputs/outputs described in FIGS. 1-10 could be utilized. An input optical fiber 670 is optically coupled to optical input 666, an output optical fiber 671 is optically coupled to optical output 667, an input optical fiber 672 is optically coupled to optical input 668, and an output optical fiber 673 is optically coupled to optical output 669. Further, a basic lid 614 is sealed to base 612 and input/output optical fibers 670, 671, 672, and 673 as described and illustrated generally in conjunction with FIG. 9 above. One or more embedded lids 514' are included to hermetically seal various components within integrated laser/polymer modulator 662 and/or 664.

Figure 19:
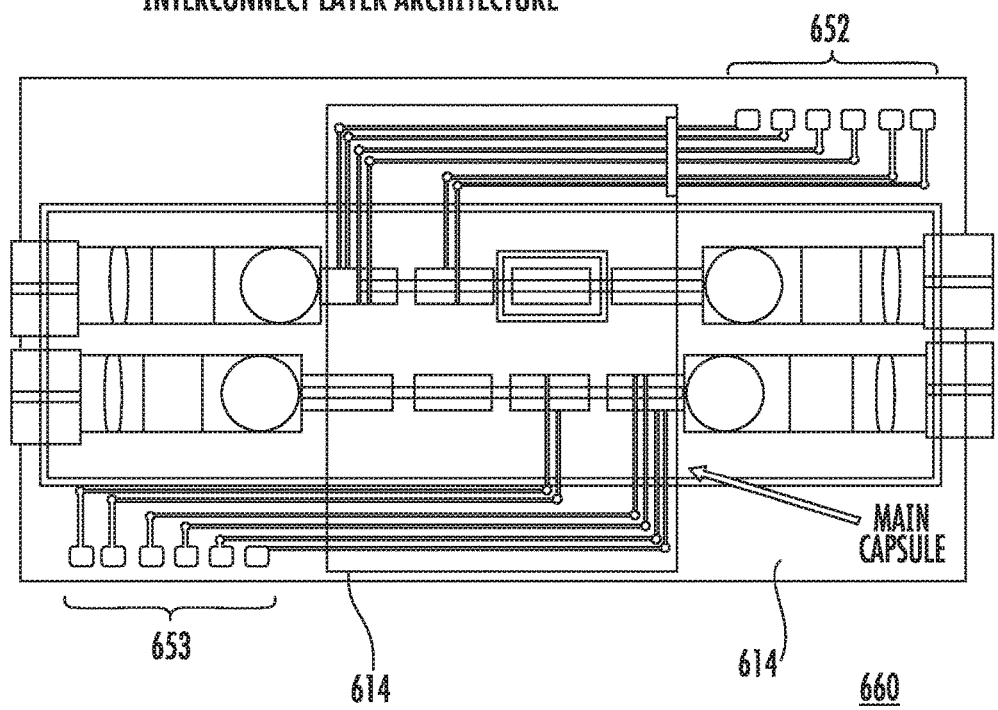
FIG. 19 is a top plan view illustrating another embodiment of the hermetic capsule of FIG. 17 further illustrating the external electrical connections, in accordance with the present invention.

Turning to FIG. 19, the position of electrical interconnect layers 34 and the various optical components are illustrated in another top view of basic hermetic capsule 660 illustrating externally accessible electrical contacts or contact pads 652 and 653. In this specific example, basic lid 614 is sealed to base 612 generally as illustrated and explained in conjunction with FIG. 4L above. It will be understood that any of the lid/base sealing examples disclosed and described in FIGS. 1-10 above can be used to seal a basic lid to base 612. Thus, it can be seen that an embedded hermetic capsule can be included to hermetically encapsulate one or more components and a basic hermetic capsule hermetically encapsulates all of the various semiconductor/polymer components while allowing multiple external electrical and optical access. The electrical interconnect layers and externally accessible electrical contacts or contact pads 652 and 653 are applicable to all embodiments and capsule designs.

In each of the above described basic and embedded hermetic capsules (including all structures/modifications), the semiconductor/metal embedded lid is sealed to the semiconductor/metal base by metallization so as to form a chamber including one or more sensitive semiconductor/polymer components and hermetically seal the sensitive components from the ambient. Also in each of the above described embedded and basic hermetic capsules (including all structures/modifications), the semiconductor/metal basic lid is sealed to the semiconductor/metal base by metallization so as to form a chamber including all sensitive semiconductor/polymer components and hermetically seal all sensitive components and any embedded hermetic capsule or capsules from the ambient. In a preferred embodiment, the embedded lid and the basic lid and base are fabricated from the same or similar material so that the coefficient of temperature expansion is not a problem. In the various modifications illustrated and described, some components are added or subtracted, as preferred in different applications, and the peripheral seal between basic lid and base is moved to provide different sealing surfaces for different applications or metallizing procedures. In all instances of the structures/modifications, a basic hermetic capsule for hermetically sealing semiconductor/polymer material and especially for monolithic photonic integrated circuits (PICs) and optical components therein may include one or more embedded hermetic capsules. In all instances the embedded hermetic capsule and the basic hermetic capsule provide an optical pathway for optical fiber connections and high performance signaling (both electrical and optical). Further, both the base and the embedded and basic lids are fabricated on a wafer scale that is cost effective.

Thus, new and improved embedded and basic hermetic capsules for sealing multiple input, multiple output, and/or multiple input and output electrical and/or optical components on a common platform is illustrated and disclosed. In a preferred embodiment, the embedded hermetic capsule contains and hermetically seals a laser and/or polymer modulator integrated on a common platform. The combination of embedded and basic hermetic capsules with multiple inputs and/or outputs more efficiently seals sensitive components integrated on a common platform with electrical and optical coupling to the exterior. Also, fabrication of both the embedded and basic hermetic capsule is performed in a wafer scale solution that is cost effective.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An hermetically sealed monolithic photonic integrated circuit (PIC) including optical components and multiple optical and electrical inputs/outputs comprising:
   a semiconductor/metal base including sensitive semiconductor/polymer electrical and optical components with multiple optical and electrical inputs, multiple optical and electrical outputs, and/or multiple optical and electrical inputs and outputs;
   a semiconductor/metal basic lid;
   the semiconductor/metal basic lid sealed to the semiconductor/metal base by metallization so as to form a chamber including the sensitive semiconductor/polymer electrical and optical components and hermetically sealing the chamber and the sensitive component from the ambient in a basic hermetic capsule.

2. The hermetically sealed monolithic photonic integrated circuit (PIC) including optical components and multiple optical and electrical inputs/outputs as claimed in claim 1 wherein the semiconductor/metal base includes multiple layers of metal/dielectric material defining insulated electrical interconnect layers adjacent the upper surface extending from electrical components to externally accessible contact pads.

3. The hermetically sealed monolithic photonic integrated circuit (PIC) including optical components and multiple optical and electrical inputs/outputs as claimed in claim 2 wherein the sensitive semiconductor/polymer electrical and optical components include at least two monolithic photonic integrated circuits with electrical components and the insulated electrical interconnect layers adjacent the upper surface extend from the electrical components to externally accessible contact pads.

4. The hermetically sealed monolithic photonic integrated circuit (PIC) including optical components and multiple optical and electrical inputs/outputs as claimed in claim 2 wherein the electrical interconnect layers are buried in an insulating oxide or polymer layer or layers to avoid current leakage between adjacent lines and to avoid shorting to the metallization seal of the basic lid.

5. The hermetically sealed monolithic photonic integrated circuit (PIC) including optical components and multiple optical and electrical inputs/outputs as claimed in claim 1 wherein the metallization sealing the semiconductor/metal lid to the semiconductor/metal base defines multiple optical pathways coupling multiple optical fibers to optical components sealed within the chamber.

6. The hermetically sealed monolithic photonic integrated circuit (PIC) including optical components and multiple optical and electrical inputs/outputs as claimed in claim 1 further including multiple optical input/output ports coupling multiple optical fibers to the optical components sealed within the chamber.

7. The hermetically sealed monolithic photonic integrated circuit (PIC) including optical components and multiple optical and electrical inputs/outputs as claimed in claim 5 wherein each of the multiple optical pathways includes at least one of a spherical lens, an optical focusing lens of the GRIN type, an optical isolator, and an optical lens.

8. The hermetically sealed monolithic photonic integrated circuit (PIC) including optical components and multiple optical and electrical inputs/outputs as claimed in claim 1 wherein the sensitive semiconductor/polymer electrical and optical components define a monolithic photonic integrated circuit with one of an optical input and optical output or multiple optical outputs.

9. The hermetically sealed monolithic photonic integrated circuit (PIC) including optical components and multiple optical and electrical inputs/outputs as claimed in claim 1 wherein the sensitive semiconductor/polymer electrical and optical components define two monolithic photonic integrated circuits, each monolithic photonic integrated circuit including one of an optical input and optical output or multiple optical outputs.

10. An hermetically sealed monolithic photonic integrated circuit (PIC) including optical components and multiple optical and electrical inputs/outputs comprising:
    a semiconductor/metal base including sensitive semiconductor/polymer electrical and optical components with multiple optical and electrical inputs, multiple optical and electrical outputs, and/or multiple optical and electrical inputs and outputs;
    a semiconductor/metal embedded lid;
    the semiconductor/metal embedded lid sealed to the semiconductor/metal base by metallization so as to form a chamber including at least one of the sensitive semiconductor/polymer electrical and optical components and hermetically sealing the chamber and the at least one sensitive component from the ambient in an embedded hermetic capsule; and
    a basic hermetic capsule surrounding and hermetically sealing the sensitive semiconductor/polymer electrical and optical components including the embedded hermetic capsule, and the basic hermetic capsule including multiple optical pathways coupling multiple optical fibers to the optical components sealed within the chamber.

11. The hermetically sealed monolithic photonic integrated circuit (PIC) including optical components and multiple optical and electrical inputs/outputs as claimed in claim 10 wherein the semiconductor/metal base includes multiple layers of metal/dielectric material defining insulated electrical interconnect layers adjacent the upper surface extending from electrical components to externally accessible contact pads.

12. The hermetically sealed monolithic photonic integrated circuit (PIC) including optical components and multiple optical and electrical inputs/outputs as claimed in claim 11 wherein the sensitive semiconductor/polymer electrical and optical components include at least two monolithic photonic integrated circuits with electrical components and the insulated electrical interconnect layers adjacent the upper surface extend from the electrical components to externally accessible contact pads.

13. The hermetically sealed monolithic photonic integrated circuit (PIC) including optical components and multiple optical and electrical inputs/outputs as claimed in claim 10 wherein the sensitive semiconductor/polymer electrical and optical components define a monolithic photonic integrated circuit with one of an optical input and optical output or multiple optical outputs.

14. The hermetically sealed monolithic photonic integrated circuit (PIC) including optical components and multiple optical and electrical inputs/outputs as claimed in claim 10 wherein the sensitive semiconductor/polymer electrical and optical components define two monolithic photonic integrated circuits, each monolithic photonic integrated circuit including one of an optical input and optical output or multiple optical outputs.

15. The hermetically sealed monolithic photonic integrated circuit (PIC) including optical components and multiple optical and electrical inputs/outputs as claimed in claim 10 wherein the monolithic photonic integrated circuit includes at least one integrated laser/polymer modulator, the integrated laser including one of a distributed feedback laser, a Fabry Perot laser, a distributed Bragg reflector laser, or a tunable laser, and the polymer modulator including one of a Mach-Zehnder structure, a ridge waveguide modulator, a slot modulator, or any modulator that can be conveniently fabricated in EO polymer based material.

16. A method of fabricating an hermetically sealed monolithic photonic integrated circuit (PIC) including optical components and multiple optical and electrical inputs/outputs comprising the steps of:

providing a first semiconductor/metal wafer;

fabricating sensitive semiconductor/polymer electrical and optical components in the first semiconductor/metal wafer defining a semiconductor/metal base;

fabricating a semiconductor/metal embedded lid in a shell-like form providing edges defining a volume space within the edges;

hermetically sealing the edges of the semiconductor/metal embedded lid to the semiconductor/metal base by metallization so as to form a first chamber including at least one of the sensitive semiconductor/polymer electrical and optical components, the embedded lid and base defining an embedded hermetic capsule hermetically sealing the at least one sensitive semiconductor/polymer electrical and optical component from the ambient;

fabricating a semiconductor/metal basic lid in a shell-like form providing edges defining a volume space within the edges; and hermetically sealing the edges of the semiconductor/metal basic lid to the semiconductor/metal base by metallization so as to form a second chamber including the sensitive semiconductor/polymer electrical and optical components and the embedded hermetic capsule, the basic lid and base defining a basic hermetic capsule hermetically sealing the sensitive semiconductor/polymer electrical and optical components and the embedded hermetic capsule from the ambient, and providing multiple optical pathways coupling multiple optical fibers to the optical components sealed within the chamber.

17. The method as claimed in claim 16 including the steps of forming semiconductor/metal base with multiple layers of metal/dielectric material defining insulated electrical interconnect layers adjacent the upper surface extending from electrical components to externally accessible contact pads.

18. The method as claimed in claim 16 including a step of forming the sensitive semiconductor/polymer electrical and optical components to define a monolithic photonic integrated circuit with one of an optical input and optical output or multiple optical outputs.

19. The method as claimed in claim 16 including a step of forming the sensitive semiconductor/polymer electrical and optical components into two monolithic photonic integrated circuits, each monolithic photonic integrated circuit including one of an optical input and optical output or multiple optical outputs.

* * * * *